United States Patent
Koga et al.

(10) Patent No.: US 12,162,373 B2
(45) Date of Patent: Dec. 10, 2024

(54) ELECTRIC REFUSE VEHICLE BATTERY EXCHANGE AND TRAILER

(71) Applicant: Oshkosh Corporation, Oshkosh, WI (US)

(72) Inventors: Jeffrey Koga, Oshkosh, WI (US); Emily Davis, Rochester, MN (US); Clinton T. Weckwerth, Pine Island, MN (US); Vincent Hoover, Byron, MN (US); Zachary L. Klein, Rochester, MN (US); Jerrod Kappers, Oshkosh, WI (US); Derek A. Wente, Austin, MN (US); Logan Gary, Oshkosh, WI (US); Joshua D. Rocholl, Rochester, MN (US); Nader Nasr, Neenah, WI (US); Chad K. Smith, Omro, WI (US)

(73) Assignee: Oshkosh Corporation, Oshkosh, WI (US)

( * ) Notice: Subject to any disclaimer, the term of this patent is extended or adjusted under 35 U.S.C. 154(b) by 292 days.

(21) Appl. No.: 17/483,988

(22) Filed: Sep. 24, 2021

(65) Prior Publication Data
US 2022/0097555 A1   Mar. 31, 2022

Related U.S. Application Data

(60) Provisional application No. 63/084,176, filed on Sep. 28, 2020.

(51) Int. Cl.
*B60L 53/80* (2019.01)
*B60K 1/04* (2019.01)
(Continued)

(52) U.S. Cl.
CPC ............... *B60L 53/80* (2019.02); *B60K 1/04* (2013.01); *B60L 50/66* (2019.02); *B60S 5/06* (2013.01);
(Continued)

(58) Field of Classification Search
CPC .......... B60L 53/80; B60L 50/66; B60K 1/04; B60K 2001/0477; B60K 2001/0483;
(Continued)

(56) References Cited

U.S. PATENT DOCUMENTS 5,539,296 A  *  7/1996  Ito
10,021,467 B1 *  7/2018  Dunbar
(Continued)

FOREIGN PATENT DOCUMENTS

DE  102010014095 A1 * 10/2011
GB  2570870 A  *  8/2019

OTHER PUBLICATIONS

A translation of Schillings (DE 102010014095 A1) (Year: 2011).*

*Primary Examiner* — James A Shriver, II
*Assistant Examiner* — Nicholas R. Kandas
(74) *Attorney, Agent, or Firm* — Foley & Lardner LLP

(57) ABSTRACT

A refuse vehicle includes a chassis, a refuse container coupled to the chassis, a tractive assembly coupled to the chassis and configured to propel the refuse vehicle, and an electric energy system configured to provide electrical energy to drive the tractive assembly. In a first configuration, a first energy system is removably coupled to the chassis and configured to provide the electrical energy to the electric energy system and in a second configuration, the first energy system is removed from the chassis and replaced with a second energy system, the second energy system removably coupled to the chassis and configured to provide the electrical energy to the electric energy system.

20 Claims, 29 Drawing Sheets

(51) Int. Cl.
*B60L 50/60* (2019.01)
*B60S 5/06* (2019.01)
*B65F 3/02* (2006.01)

(52) U.S. Cl.
CPC ........ *B65F 3/02* (2013.01); *B60K 2001/0477* (2013.01); *B60K 2001/0483* (2013.01); *B60K 2001/0494* (2013.01)

(58) Field of Classification Search
CPC ...... B60K 2001/0494; B60S 5/06; B65F 3/02; B65F 3/00
See application file for complete search history.

(56) References Cited

U.S. PATENT DOCUMENTS

| | | |
|---|---|---|
| 2015/0114736 A1* | 4/2015 | Avganim |
| 2021/0276448 A1* | 9/2021 | Balasingham |
| 2022/0119054 A1* | 4/2022 | Subramanian |

\* cited by examiner

ELECTRIC REFUSE VEHICLE BATTERY EXCHANGE AND TRAILER

CROSS-REFERENCE TO RELATED PATENT APPLICATIONS

This application claims the benefit of and priority to U.S. Provisional Patent Application No. 63/084,176, filed Sep. 28, 2020, the content of which is hereby incorporated by reference in its entirety.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

In conventional, internal combustion engine refuse vehicles, the refuse vehicles may be relatively quickly and easily refueled. In contrast, the resupplying of an exclusively electric-powered refuse vehicle requires a charging of the energy system used to power the vehicle. With the current state of battery technology, and in light of the significant power requirements of a refuse vehicle, recharging of the energy system is time consuming process, which may interfere with the availability of the refuse vehicle for use. Accordingly, it would be advantageous to provide an energy storage and/or generation system and a corresponding removal assembly that would allow the energy storage/generation system to be easily and quickly removed from the refuse vehicle.

SUMMARY

One embodiment of the present application relates to a refuse vehicle. The refuse vehicle includes a chassis, a refuse container coupled to the chassis, a tractive assembly coupled to the chassis and configured to propel the refuse vehicle, and an electric energy system configured to provide electrical energy to drive the tractive assembly. In a first configuration, a first energy system is removably coupled to the chassis and configured to provide the electrical energy to the electric energy system and in a second configuration, the first energy system is removed from the chassis and replaced with a second energy system, the second energy system removably coupled to the chassis and configured to provide the electrical energy to the electric energy system.

Another embodiment of the present application relates to a replaceable battery system for a refuse vehicle. The system includes a first energy system having a first frame and a first plurality of battery assemblies. The system also includes a second energy system having a second frame and a second plurality of battery assemblies. In a first configuration, the first energy system is coupled to a chassis of the refuse vehicle and is configured to provide electrical energy to a prime mover of the refuse vehicle in order to drive one or more tractive elements to propel the refuse vehicle. In a second configuration, the first energy system is removed and the second energy system is coupled to the chassis and is configured to provide the electrical energy to the prime mover.

Yet another embodiment of the present application relates to a method of replacing a power source of a refuse vehicle. The method includes providing the refuse vehicle including a chassis, a plurality of tractive elements coupled to the chassis and driven by an electric motor, and a first energy system releasably coupled to the chassis. The first energy system is configured to selectively provide electrical energy to the electric motor. The method includes disengaging the first energy system from the chassis, supporting, by a removal assembly, the first energy system, moving the first energy system relative to the chassis, and coupling a second energy system to the chassis such that the second energy system provides electrical energy to the electric motor.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, an energy storage and/or generation system for a refuse vehicle is disclosed herein. The energy storage/generation system, herein referred to as "the energy system," may be any sort of device capable of storing, generating, and/or providing electrical energy. The energy system may be positioned to be easily accessible and/or removable from the refuse vehicle. Ease of access and removability reduce the labor involved in servicing an energy system, making routine inspection and servicing more feasible and thereby increasing the life of the energy system.

Furthermore, removability allows the energy system to be "hot-swapped" when it is depleted of charge for a fresh battery, thereby enabling greater uptime for a refuse vehicle. In addition, a removable energy system may be safely charged at greater speeds than an energy system confined to a refuse vehicle, thereby allowing for a smaller number of energy systems to be used to support a fleet of refuse vehicles. Finally, the energy system may be modular, allowing individual components of the energy system to be easily replaced for one another. Modularity not only reduces maintenance costs but also allows for future upgrades to the energy system. For example, the batteries of the energy system may be easily upgraded to future chemistries not yet available.

Overall Vehicle

Figure 1:
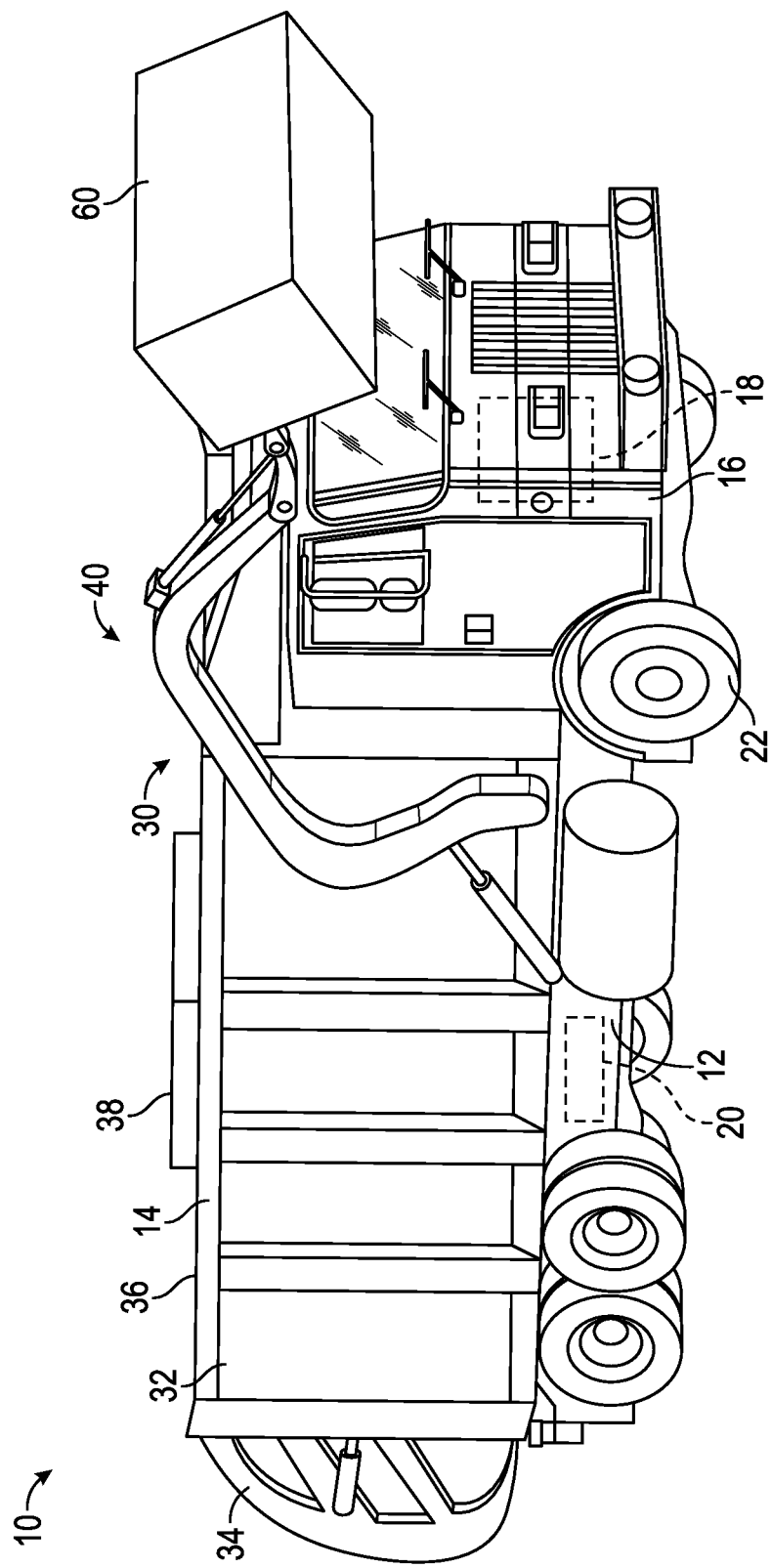
FIG. 1 is a perspective view of a refuse vehicle, according to an exemplary embodiment.

As shown in FIG. 1, a vehicle, shown as refuse vehicle 10 (e.g., a garbage truck, a waste collection truck, a sanitation truck, a recycling truck, etc.), is configured as a front-loading refuse truck. In other embodiments, the refuse vehicle 10 is configured as a side-loading refuse truck or a rear-loading refuse truck. In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, actuator controls, a user interface, switches, buttons, dials, etc.).

As shown in FIG. 1, the refuse vehicle 10 includes a prime mover, shown as electric motor 18, and an energy storage/generation system, shown as energy system 20. In other embodiments, the prime mover is or includes an internal combustion engine. According to the exemplary embodiment shown in FIG. 1, the electric motor 18 is coupled to the frame 12 at a position beneath the cab 16. The electric motor 18 is configured to provide power to a plurality of tractive elements, shown as wheels 22 (e.g., via a drive shaft, axles, etc.). In other embodiments, the electric motor 18 is otherwise positioned and/or the refuse vehicle 10 includes a plurality of electric motors to facilitate independently driving one or more of the wheels 22. In still other embodiments, the electric motor 18 or a secondary electric motor is coupled to and configured to drive a hydraulic system that powers hydraulic actuators. According to the exemplary embodiment shown in FIG. 1, the energy system 20 is coupled to the frame 12 beneath the body 14. In other embodiments, the energy system 20 is otherwise positioned (e.g., within a tailgate of the refuse vehicle 10, beneath the cab 16, along the top of the body 14, within the body 14, etc.).

According to an exemplary embodiment, the energy system 20 is configured to (a) receive, generate, and/or store power and (b) provide electric power to (i) the electric motor 18 to drive the wheels 22, (ii) electric actuators of the refuse vehicle 10 to facilitate operation thereof (e.g., lift actuators, tailgate actuators, packer actuators, grabber actuators, etc.), and/or (iii) other electrically operated accessories of the refuse vehicle 10 (e.g., displays, lights, etc.). Accordingly, the energy system 20 can include any number of energy storage components (e.g., batteries), energy generation components (e.g., generators), and/or any combination thereof. The energy system 20 may include one or more rechargeable batteries (e.g., lithium-ion batteries, nickel-metal hydride batteries, lithium-ion polymer batteries, lead-acid batteries, nickel-cadmium batteries, etc.), capacitors, solar cells, generators, power buses, etc. In one embodiment, the refuse vehicle 10 is a completely electric refuse vehicle. In other embodiments, the refuse vehicle 10 includes an internal combustion generator that utilizes one or more fuels (e.g., gasoline, diesel, propane, natural gas, hydrogen, etc.) to generate electricity to charge the energy system 20, power the electric motor 18, power the electric actuators, and/or power the other electrically operated accessories (e.g., a hybrid refuse vehicle, etc.). For example, the refuse vehicle 10 may have an internal combustion engine augmented by the electric motor 18 to cooperatively provide power to the wheels 22.

In various embodiments, the energy system 20 is charged via an on-board generator (e.g., an internal combustion generator, a solar panel system, etc.), from an external power source (e.g., overhead power lines, mains power source through a charging input, etc.), and/or via a power regenerative braking system, and provides power to the electrically operated systems of the refuse vehicle 10. For example, the energy system 20 could be charged from one or more generators attached to the wheels 22 of the refuse vehicle 10. In another example, the energy system 20 could be charged using regenerative braking or other regenerative drive system. In some embodiments, the energy system 20 also includes a heat management system (e.g., liquid cooling, heat exchanger, air cooling, etc.).

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30, a front-loading refuse vehicle, a side-loading refuse vehicle, etc.). In other embodiments, the storage volume is positioned between the hopper volume and the cab 16 (e.g., a rear-loading refuse vehicle, etc.).

As shown in FIG. 1, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly 40 is configured to engage a container (e.g., a residential trash receptacle, a commercial trash receptacle, a container having a robotic grabber arm, etc.), shown as refuse container 60. The lift assembly 40 may include various actuators (e.g., electric actuators, hydraulic actuators, pneumatic actuators, etc.) to facilitate engaging the refuse container 60, lifting the refuse container 60, and tipping refuse out of the refuse container 60 into the hopper volume of the refuse compartment 30 through an opening in the cover 36 or through the tailgate 34. The lift assembly 40 may thereafter return the empty refuse container 60 to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.).

Energy System

Figure 2:
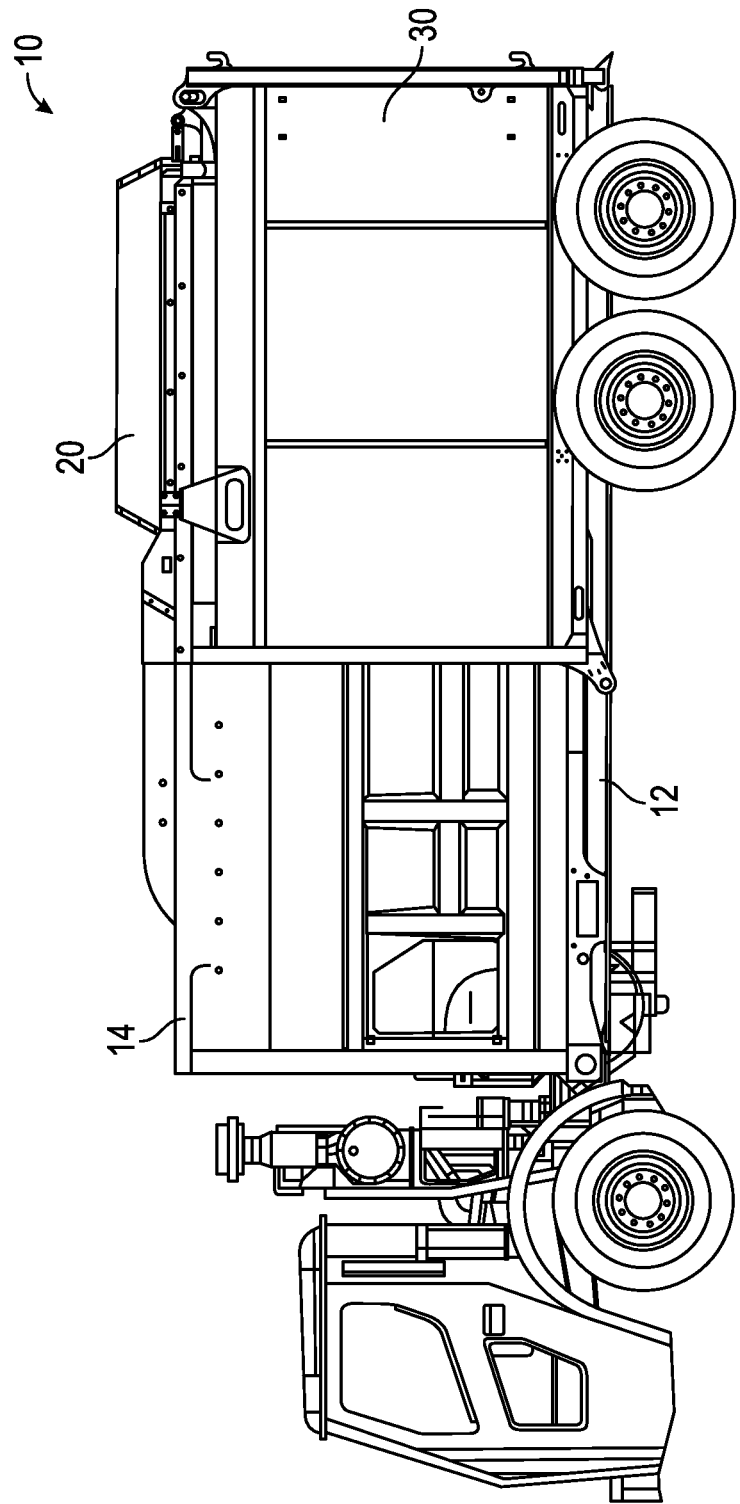
FIG. 2 is a side view of a refuse container of the refuse vehicle of FIG. 1 having a top mounted energy system, according to an exemplary embodiment.

As shown in FIG. 2, the energy system 20 is coupled to the rearward top portion of the body 14. In other embodiments, the energy system 20 is coupled to the forward top portion of the body 14. In some embodiments, the energy system 20 is removable/detachable from the body 14. Locating the energy system 20 on top of the body 14 facilitates easy access to the energy system 20. For example, a user may readily inspect and service the energy system 20 because it is located on an external surface of the refuse vehicle 10.

The energy system 20 may include one or more attachment mechanisms (e.g., pins, linkages, latches, etc.) to couple the energy system 20 to the body 14. In some embodiments, the energy system 20 is a pod or battery compartment, configured to receive and electrically couple one or more batteries. For example, the energy system 20 may allow a battery cell to be inserted from one end thereby coupling the battery cell to the energy system 20 and providing power to the refuse vehicle 10. In some embodiments, the energy system 20 is modular and facilitates easy replacement of one or more battery cells. For example, a second fully charged battery cell may replace a first depleted battery cell by uncoupling the first battery cell from the energy system 20 and replacing it with the second battery cell. In some embodiments, the entire energy system 20 is replaced with a different one of energy system 20. Replacing one or more battery cells of the energy system 20 reduces the downtime associated with charging a typical battery system. In some embodiments, the energy system 20 is "hot-swappable" and is able to replace one or more battery cells without cutting power to the refuse vehicle 10.

The energy system 20 may include an electric connection (e.g., a pantograph, a current collector, a high-voltage line, etc.) to allow the energy system 20 to connect to external power sources (e.g., an overhead power line, the grid, a charging station, etc.). For example, the energy system 20 may include a charging port to allow one or more battery cells to be charged while the energy system 20 is coupled to the refuse vehicle 10 (e.g., by a 220V charger). In some embodiments, the energy system 20 includes an electrical bypass to power the refuse vehicle 10 from a charging source while the battery is being charged. In some embodiments, the energy system 20 connects to one or more power sources of refuse vehicle 10 (e.g., an internal combustion generator, a battery, etc.) to charge the energy system 20. For example, the energy system 20 may include a connection to an onboard diesel generator configured to provide power to the energy system 20 for charging.

Figure 3:
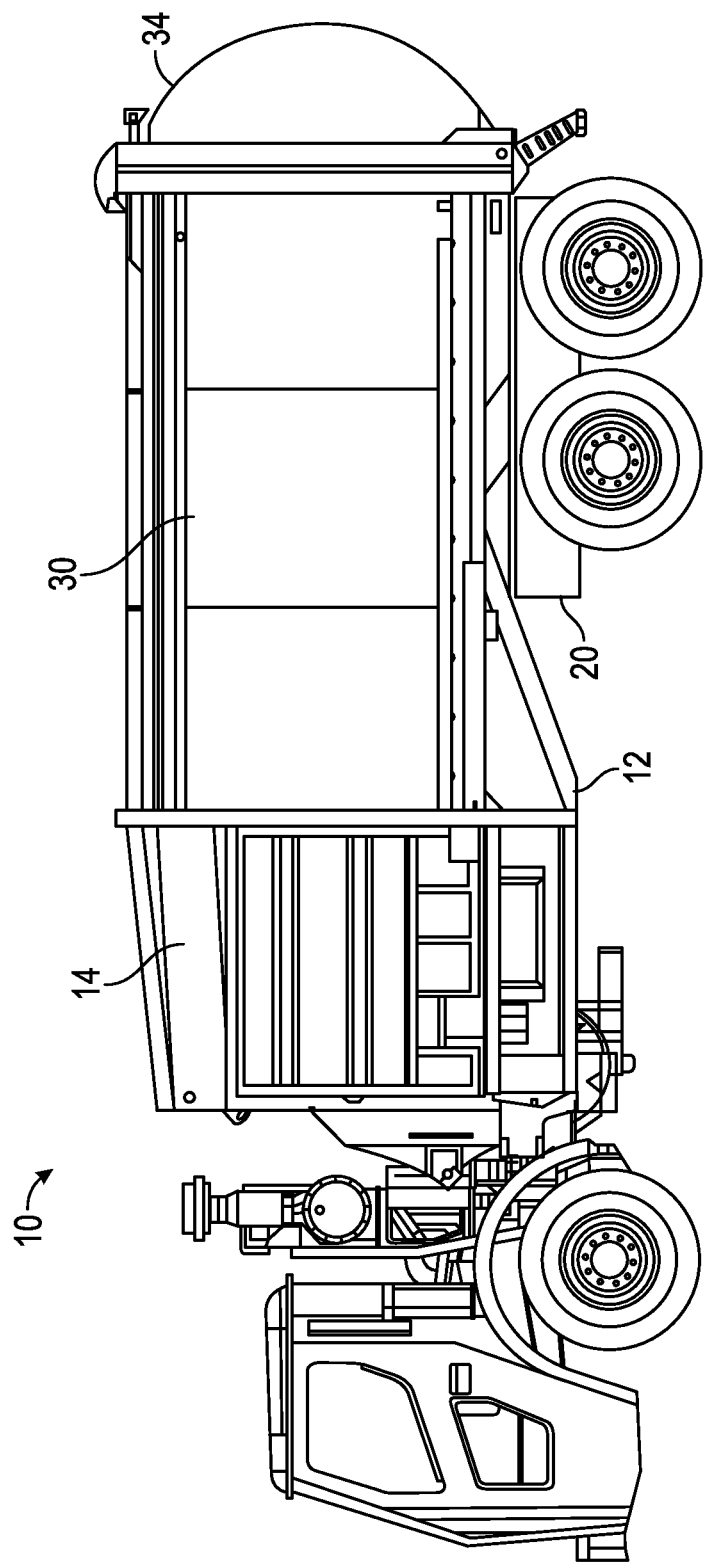
FIG. 3 is the refuse container of FIG. 1 having a bottom mounted energy system, according to an exemplary embodiment.

As shown in FIG. 3, the energy system 20 is coupled to the rearward bottom portion of the body 14. In other embodiments, the energy system 20 is coupled to the forward bottom portion of the body 14. As described above, the energy system 20 may be removable/replaceable. For example, the refuse vehicle 10 may include a door on the side of the body 14 to allow removal and replacement of the energy system 20. In some embodiments, the energy system 20 is located on a track such that the energy system 20 can slide out from the body 14 similar to a drawer. In some embodiments, the energy system 20 is modular. For example, the energy system 20 may include one or more sub-batteries to reduce the bulkiness of the energy system 20 and permit easy removal and/or replacement. Modularity further enables more precise inspection and service of battery cells and allows individual battery cells to be replaced without the need to replace an entire larger array. Furthermore, modularity enables battery cells to be easily upgraded.

As described above, the energy system 20 may include a charging port to allow the energy system 20 to receive external power for charging. For example, the refuse vehicle 10 may include a 220V charging port on a side of the body 14 to charge the energy system 20.

Figure 4:
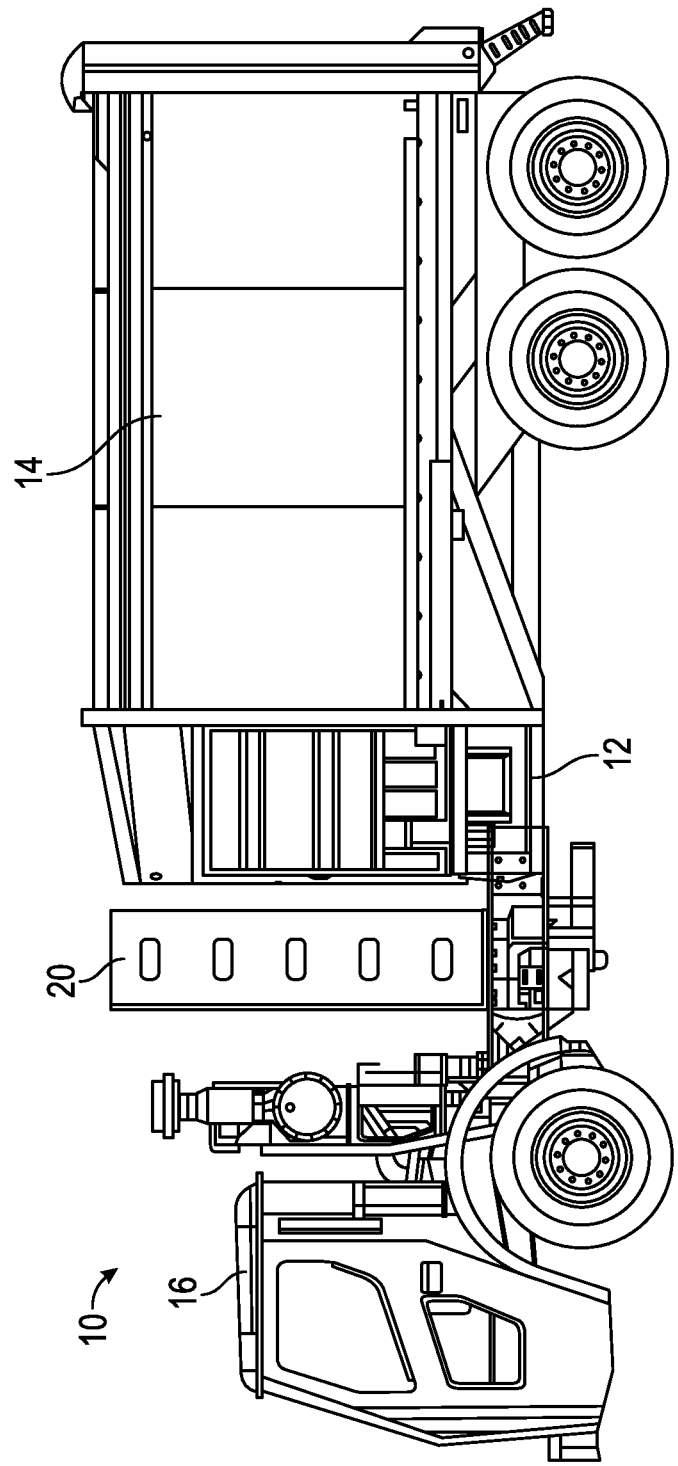
FIG. 4 is the refuse vehicle of FIG. 1 having a centralized energy system, according to an exemplary embodiment.

As shown in FIG. 4, the energy system 20 is coupled between the cab 16 and the body 14. In some embodiments, the energy system 20 is coupled to the frame 12. Locating the energy system 20 between the cab 16 and the body 14 reduces a rear weight of the refuse vehicle 10, thereby reducing component stress of weight bearing members (e.g., a rear axle). Furthermore, centrally locating the energy system 20 protects the energy system 20 from damage in the event of a collision. Furthermore, centrally locating the energy system 20 allows easy modification/retrofitting of existing refuse vehicles to include the energy system 20. The energy system 20 may be easily accessed and/or removed from the refuse vehicle 10. For example, the energy system 20 may include forklift pockets so that a forklift may easily remove the energy system 20 from the refuse vehicle 10. In some embodiments, the system 20 includes one or more eyelet connectors to receive a lifting hook or similar hoisting attachment. The energy system 20 may be configured to connect to an external rail system to quickly replace the energy system 20 by sliding it orthogonally off the refuse vehicle 10.

In some embodiments, the energy system 20 is configured to dynamically change position on the refuse vehicle 10 based on loading of the refuse vehicle 10. For example, the energy system 20 may translate horizontally along the frame 12 toward the cab 16 or toward the body 14 to change a weight distribution of the vehicle. In some embodiments, the energy system 20 includes one or more controllers to measure the weight distribution of the refuse vehicle 10 and adjust a position of the energy system 20 accordingly.

Figure 5:
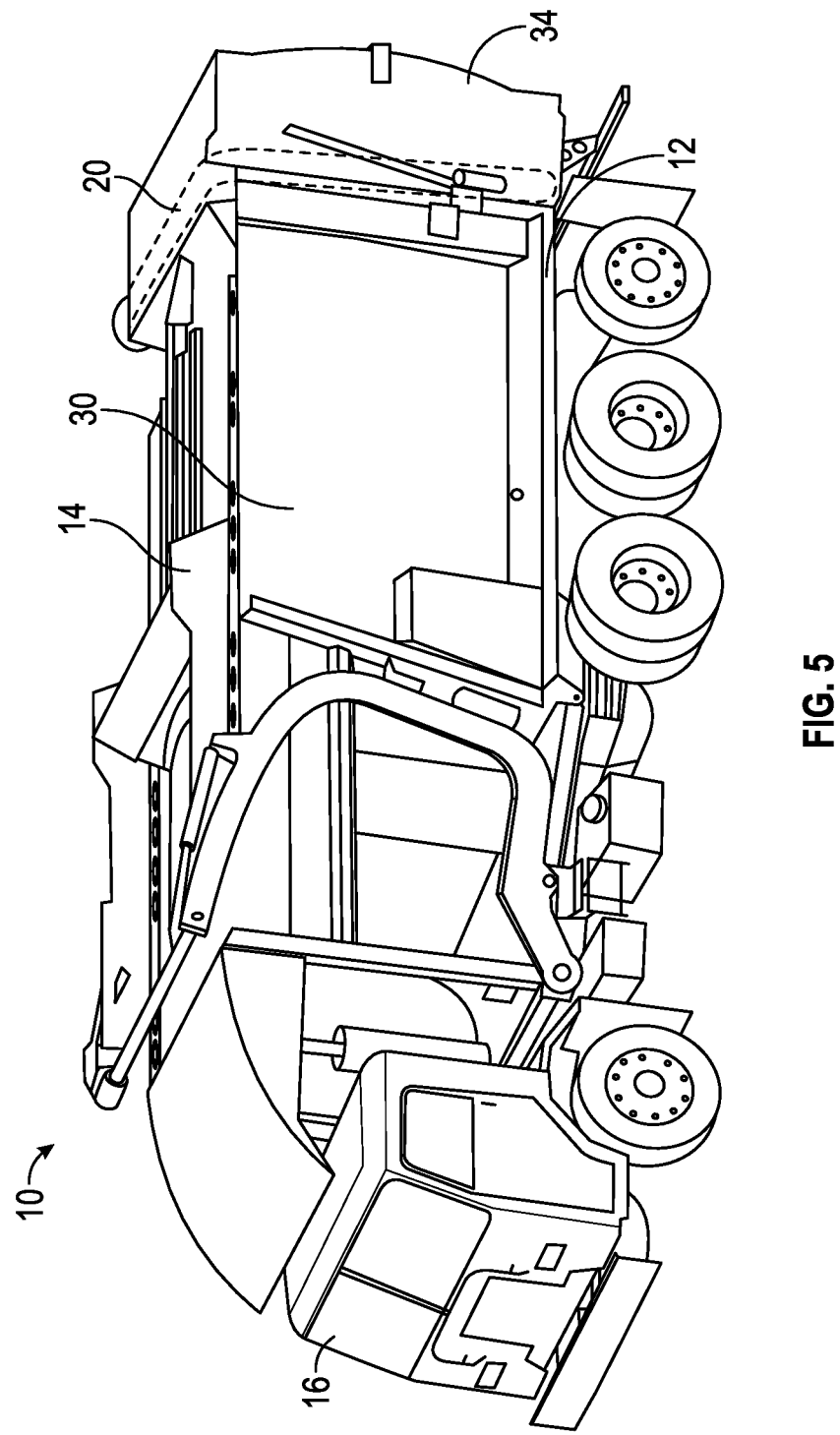
FIG. 5 is the refuse vehicle of FIG. 1 having a tailgate energy system, according to an exemplary embodiment.

As shown in FIG. 5, the energy system 20 is coupled to the tailgate 34 of the refuse vehicle 10. In some embodiments, the energy system 20 is positioned vertically along a rearward side of the refuse compartment 30. In some embodiments, the energy system 20 is positioned substantially near the base of the tailgate 34 or as part of the tailgate 34. The energy system 20 may be configured to be accessible via the tailgate 34. For example, a user could open the tailgate 34 to reveal the energy system 20. In some embodiments, the tailgate 34 includes one or more rotating elements (e.g., hinges, mechanical bearings) to facilitate rotation around a rearward corner of the refuse compartment 30. For example, the tailgate 34 could include one or more hinging mechanisms on a side to allow a user to open the tailgate 34 like a door and gain access to the energy system 20 located along the frame 12 of the refuse vehicle 10. In some embodiments, the tailgate 34 is a double door. Swinging the tailgate 34 open like a door requires less energy than lifting the tailgate 34.

In some embodiments, the tailgate 34 is fully integrated with the energy system 20 and is configured to be removable/replaceable. For example, a first tailgate 34 having a first energy system 20 could be replaced by a second tailgate 34 having a second energy system 20 when the first energy system 20 is depleted of energy. Removing and replacing the tailgate 34 may limit loss of vehicle operation due to charging time because the tailgate 34 including the depleted energy system 20 may be charged separately of the refuse vehicle 10. Furthermore, swappable energy systems enable a smaller fleet of refuse vehicles to service the same area because the reduced downtime associated with battery charging enables the refuse vehicles to operate for longer periods of time. In some embodiments, a number of racks index one or more battery cells of the energy system 20.

Figure 6:
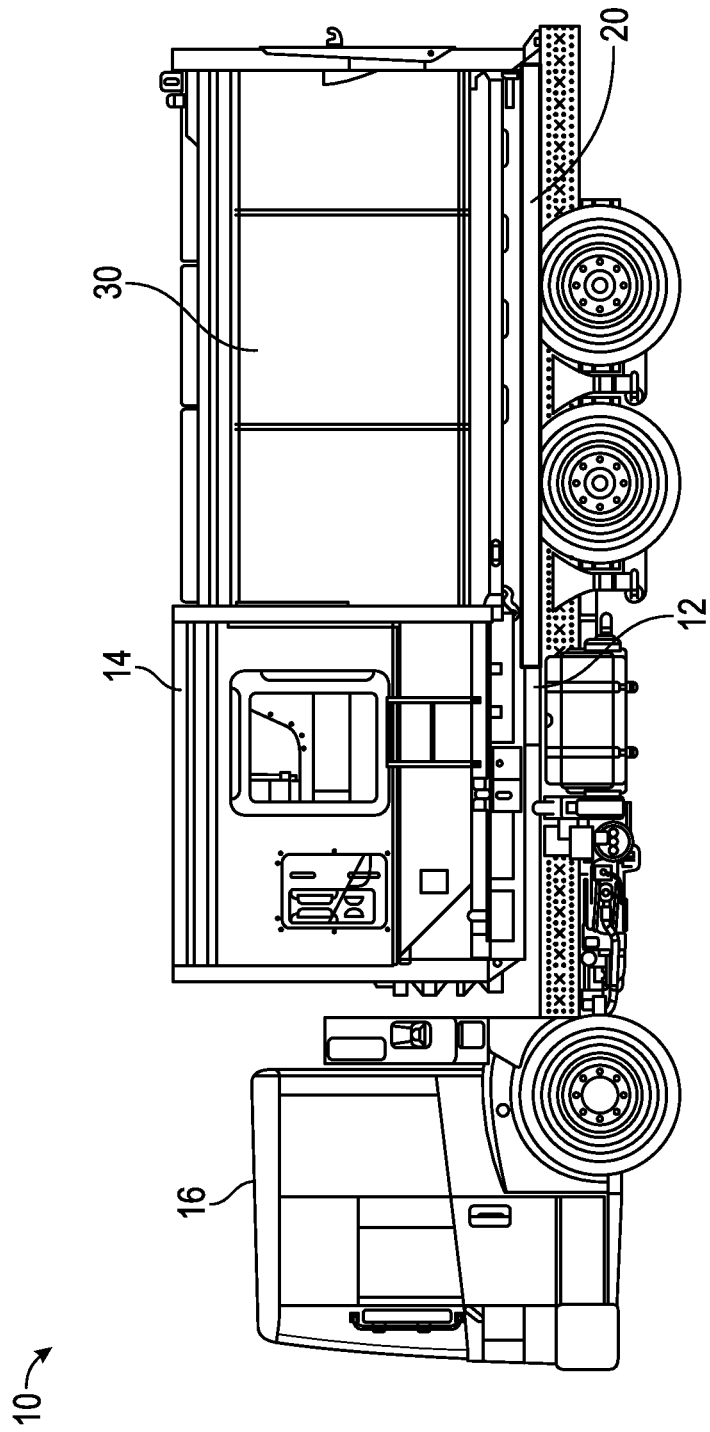
FIG. 6 is the refuse vehicle of FIG. 1 having a frame mounted energy system, according to an exemplary embodiment.

As shown in FIG. 6, the energy system 20 is coupled between the body 14 and the frame 12. As described above, in some embodiments, the energy system 20 may be configured to translate horizontally along the frame 12 of the refuse vehicle 10. For example, the energy system 20 could move between a forward portion and a rearward portion of the body 14 of the refuse vehicle 10 such that the refuse vehicle 10 is evenly loaded. As described above, in some embodiments, the energy system 20 is removable and/or replaceable. The energy system 20 may be accessed via a door on a side of the body 14 and/or via the tailgate 34. Similarly, the energy system 20 may be removed and/or replaced by another energy system. Alternatively, one or more individual battery cells of the energy system 20 could be replaced. In some embodiments, the energy system 20 can be accessed by removing the refuse compartment 30. For example, a refuse vehicle with a removable refuse compartment (e.g., a container truck) may remove the refuse compartment to reveal the energy system 20. In some embodiments, the energy system 20 is coupled to the refuse compartment 30 itself and can be removed with the refuse compartment 30. For example, a refuse vehicle could swap a first full refuse compartment with a first depleted energy system for a second empty refuse compartment with a second charged energy system.

Figure 7A:
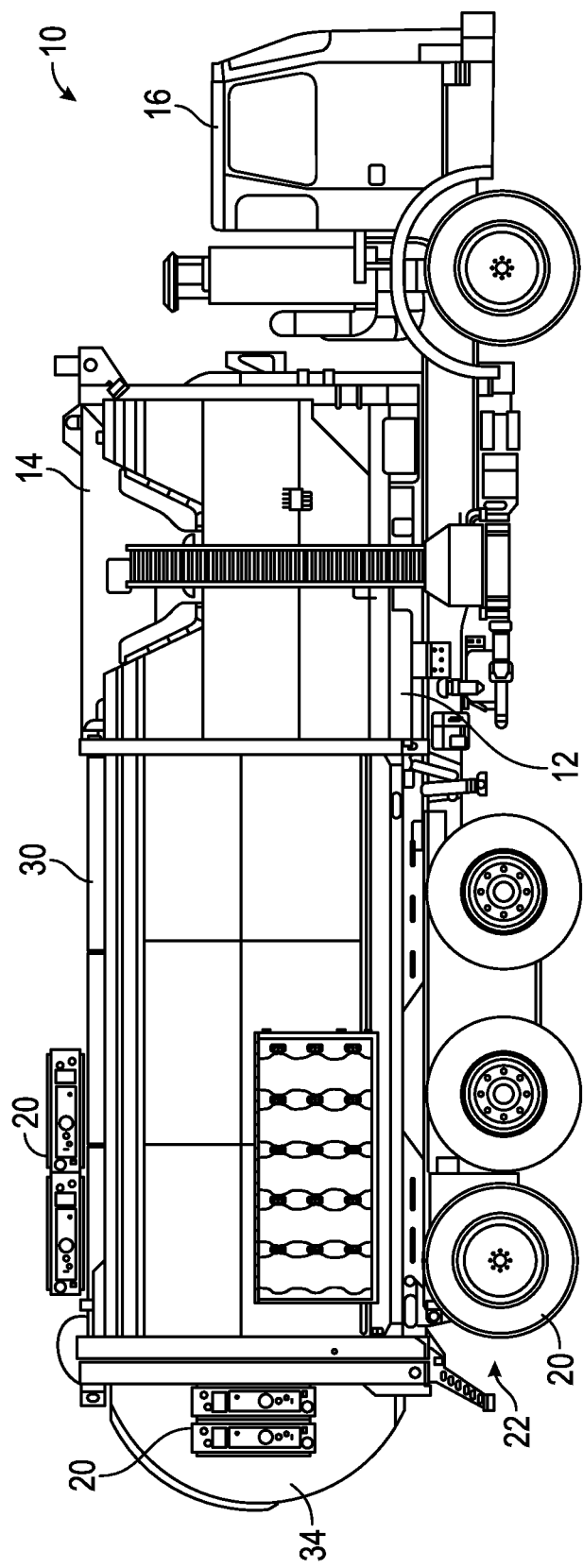
FIGS. 7A-8B are the refuse vehicle of FIG. 1 having a distributed energy system, according to several exemplary embodiments.
Figure 7B:
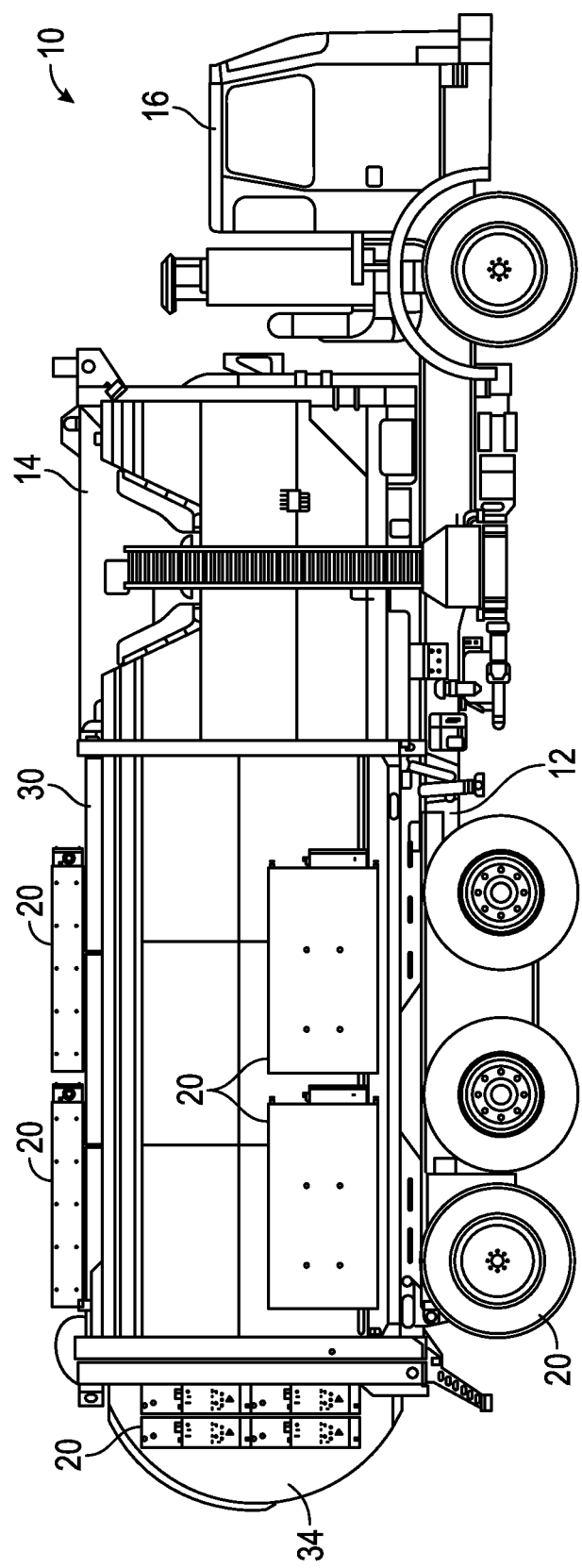
Figure 7C:
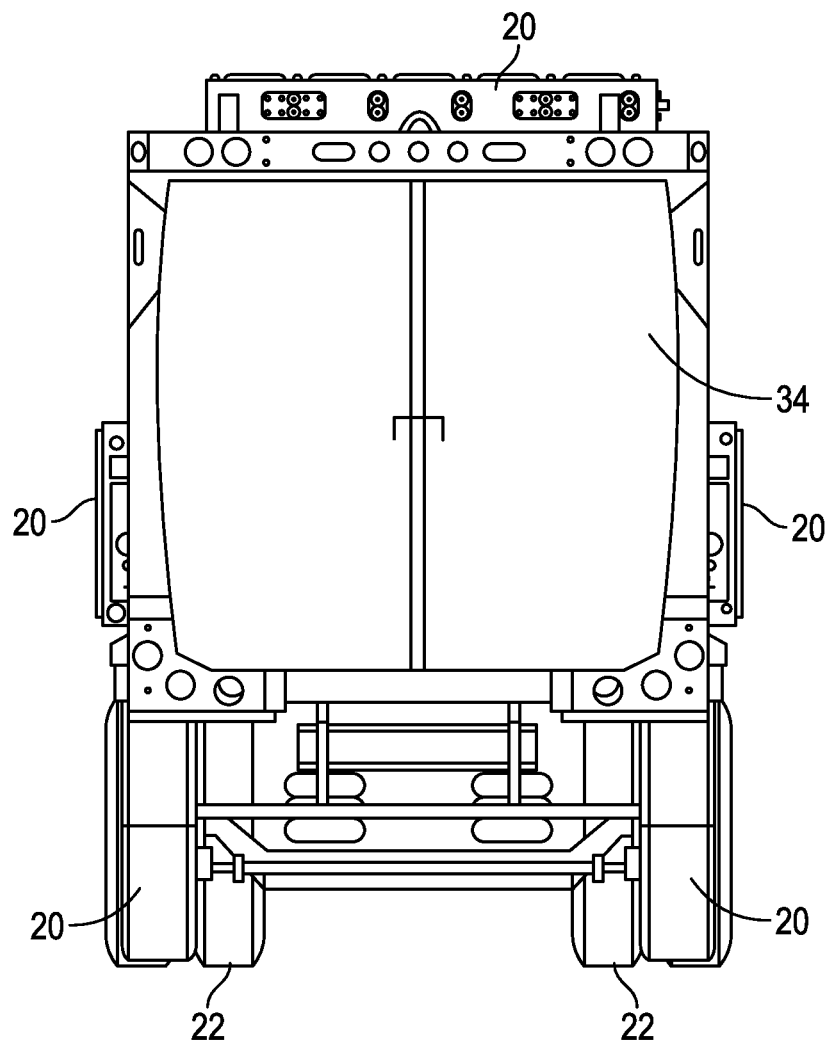
Figure 8A:
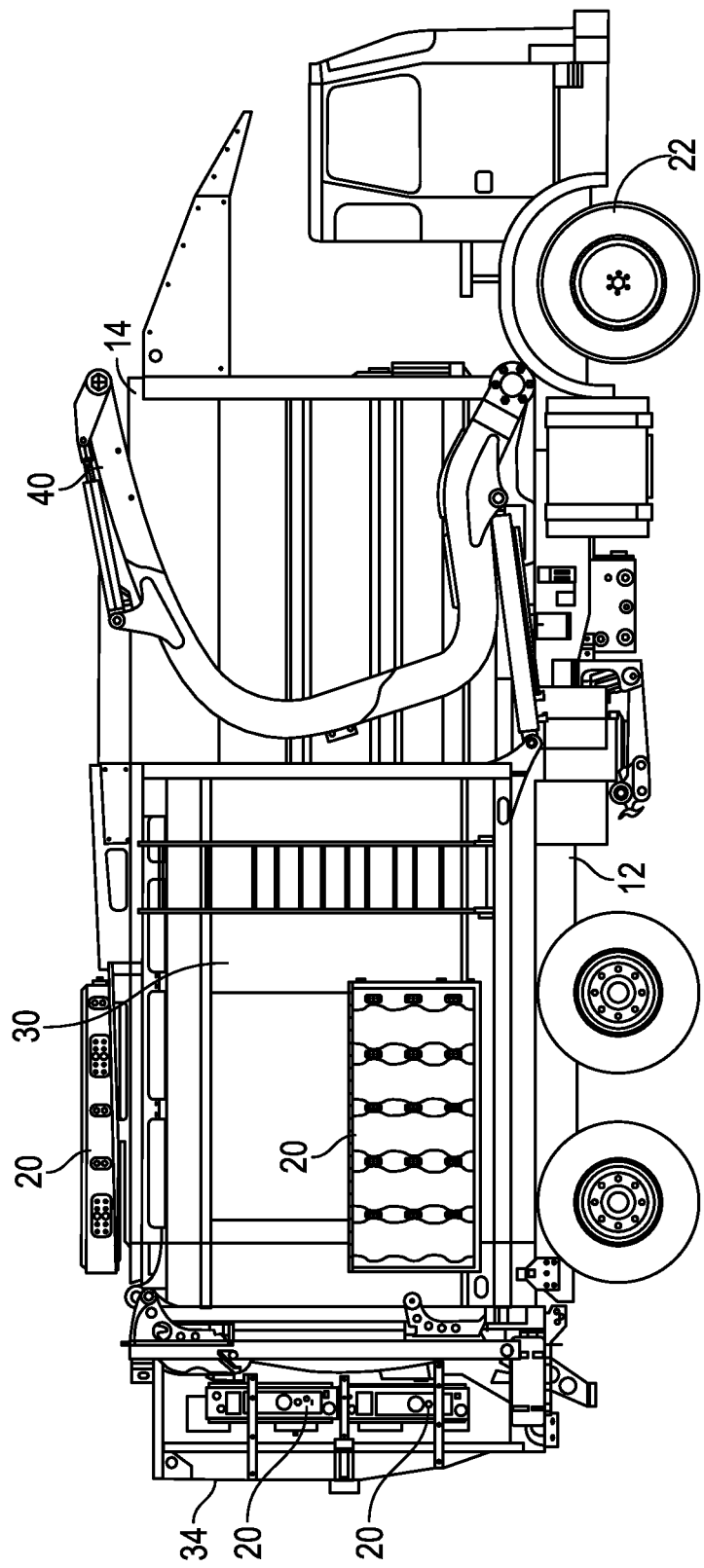
Figure 8B:
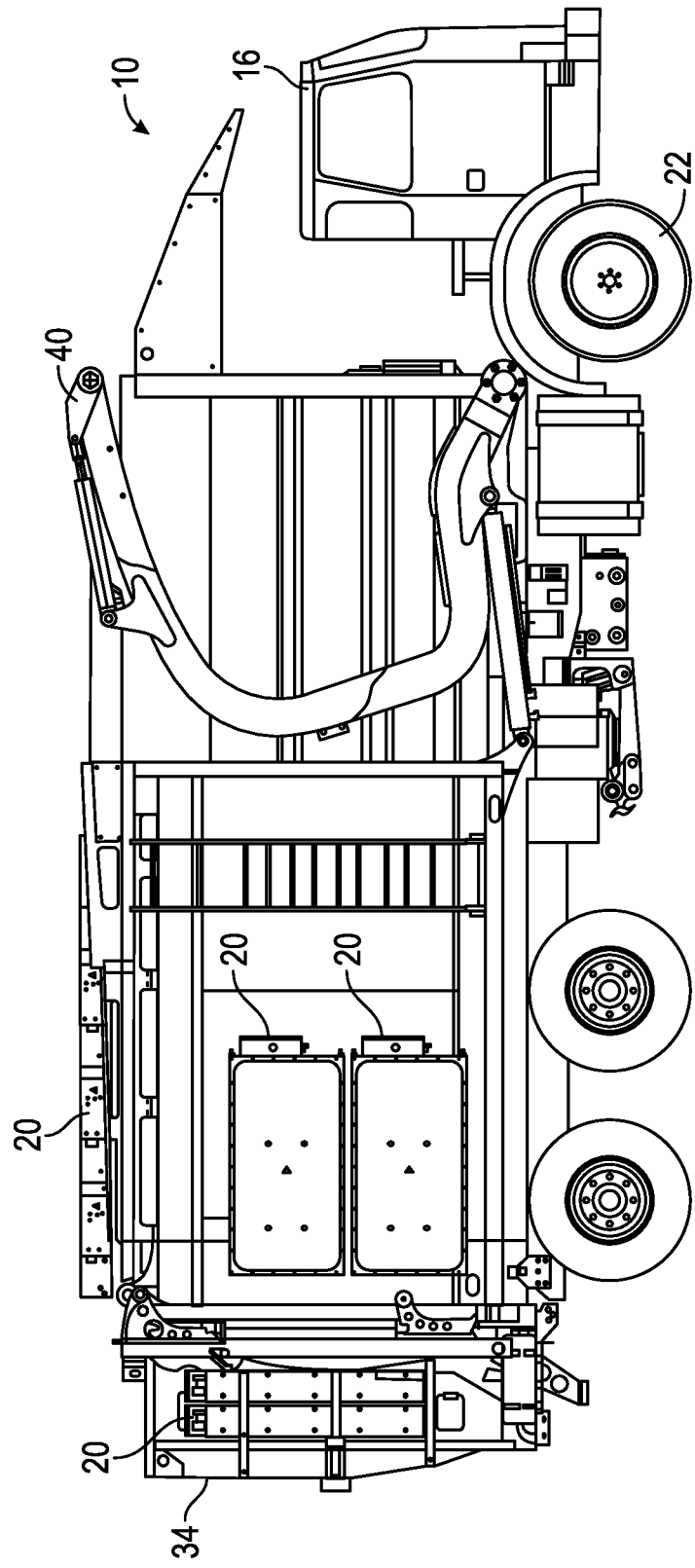

Referring now to FIGS. 7A-8B, several illustrations of an exemplary placement of the energy system 20 is shown, according to several exemplary embodiments. In various embodiments, the energy system 20 is coupled to a rearward top portion of the refuse vehicle 10 (e.g., above the refuse compartment 30, etc.). Additionally or alternatively, the energy system 20 is coupled to a rearward portion of the refuse vehicle 10. For example, the energy system 20 may be coupled to the tailgate 34 and/or a rearward portion of the refuse compartment 30 (e.g., as shown in FIGS. 7A-7C). As another example, the energy system 20 may be coupled to a vertical rear surface of the refuse compartment 30. In some embodiments, the energy system 20 or components thereof are coupled to the wheel 22. For example, an energy storage cell of the energy system 20 may be coupled to a hub of the wheels 22 and a power converter may be coupled to a top rearward portion of the refuse container 30. In some embodiments, the energy system 20 is coupled to a front and rear wheelset of the refuse vehicle 10 (e.g., as shown in FIGS. 7A-7C). In various embodiments, placement of the energy system 20 as shown in FIGS. 7A-7C facilitates shifting weight rearward on the refuse vehicle 10, thereby reducing strain on forward load bearing components (e.g., a front axle, etc.). In some embodiments, the placement of the energy system 20 shown in FIGS. 7A-7C is preferred for a rear-loading refuse vehicle 10. In various embodiments, the energy system 20 includes a different number and/or arrangement of components than shown explicitly in the figures (e.g., FIGS. 2-9B). For example, the energy system 20 may include a first component (e.g., a generator) coupled to an exterior hub surface of the front wheels 22 electrically coupled to a second component integrated with the tailgate 34. In some embodiments, the placement of the energy system 20 shown in FIGS. 8A-8B is preferred for a front-loading refuse vehicle 10 and/or a side-loading refuse vehicle 10. In various embodiments, the energy system 20, or components thereof, are detachable from the refuse vehicle 10 as described in detail above.

Figure 9A:
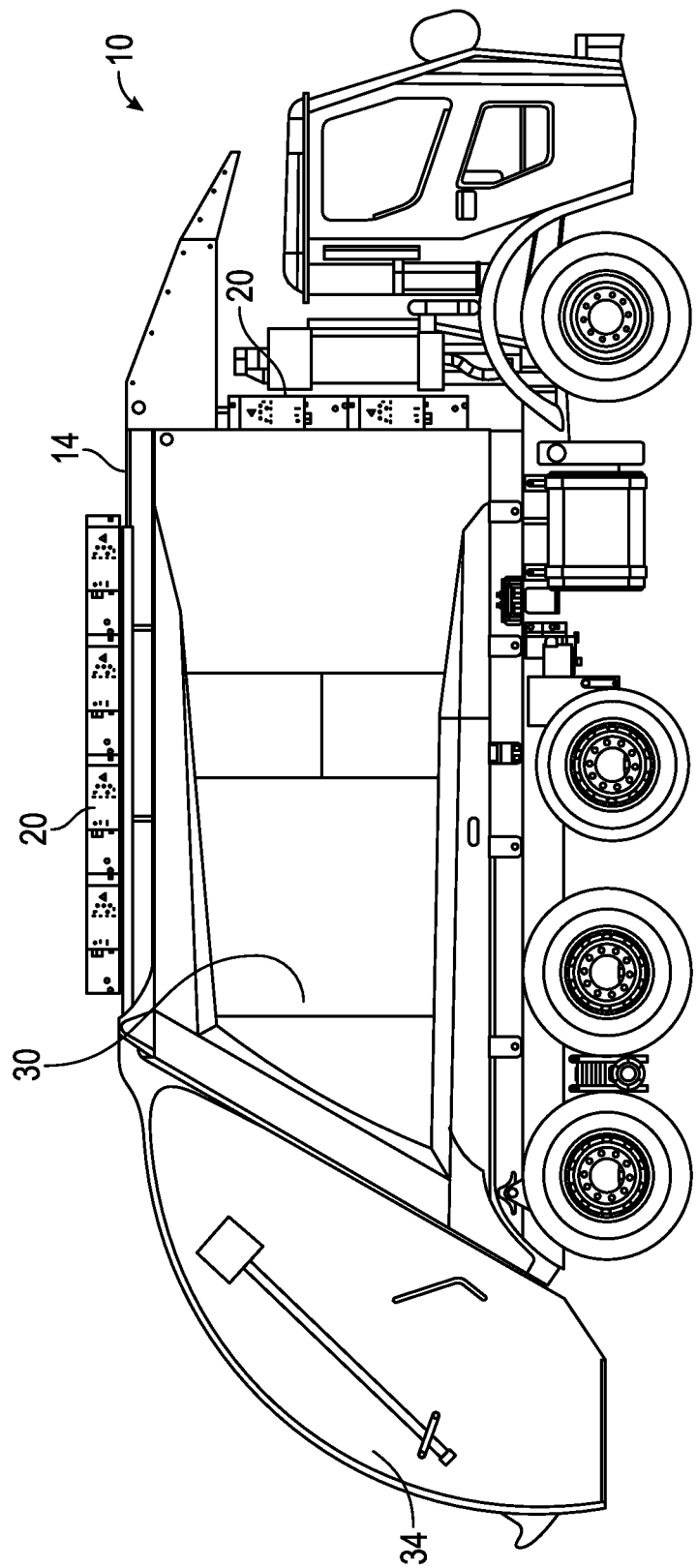
FIGS. 9A-9B are the refuse vehicle of FIG. 1 having a top energy system, according to several exemplary embodiments.
Figure 9B:
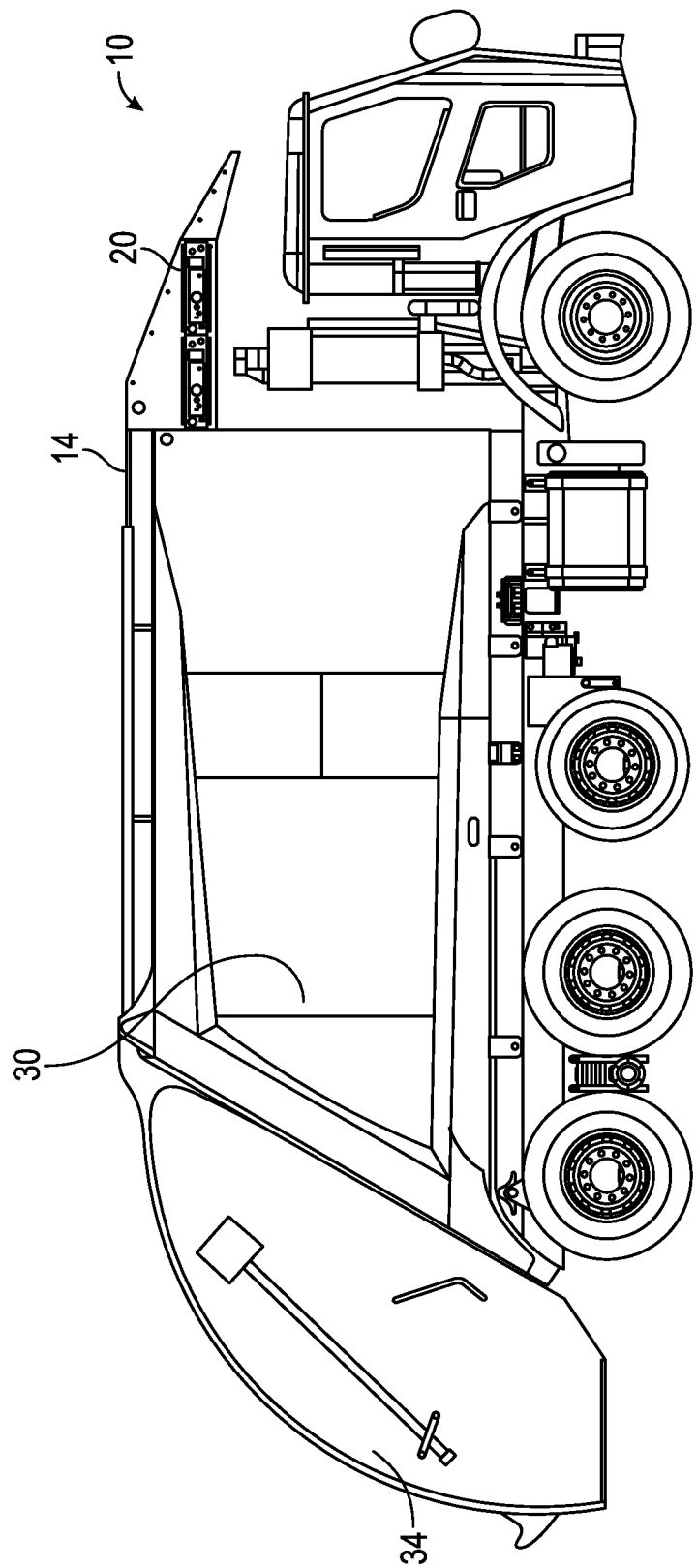

Referring now to FIGS. 9A-9B, several illustrations of another exemplary placement of the energy system 20 is shown, according to several exemplary embodiments. In various embodiments, the energy system 20 is coupled to a top portion of the refuse vehicle 10. For example, the energy system 20 may be coupled to a top portion of refuse compartment 30 and/or above the cab 16 (e.g., as shown in FIGS. 9A-9B). In some embodiments, the energy system 20 is coupled to a canopy (or other structural element) located above the cab 16. Additionally or alternatively, the energy system 20, or components thereof, may be coupled to the wheels 22. For example, a first component of the energy system 20 (e.g., a battery cell, etc.) may be coupled to an exterior hub region of the wheels 22 and a second component of the energy system 20 (e.g., a power converter, etc.) may be coupled to a structural element (e.g., a portion of frame 12, etc.) above the cab 16. In some embodiments, the placement of the energy system 20 shown in FIGS. 9A-9B is preferred for a rear-loading refuse vehicle 10. In various embodiments, the placement of the energy system 20 as shown in FIGS. 9A-9B facilitates moving weight (e.g., battery weight, etc.) forward on the refuse vehicle 10 (e.g., toward the cab 16 and away from the tailgate 34, etc.), thereby reducing stress on rear load-bearing components (e.g., a rear axle, etc.).

Energy Storage/Generation System Exchange

In some embodiments, the energy system 20 provides all of the energy used to power the refuse vehicle 10 in at least one mode of operation. In some embodiments, the energy system 20 provides all of the energy used to power the refuse vehicle 10 in all modes of operation, except when the energy system 20 is being charged by an outside power source (e.g., mains power from the power grid, etc.). As described above, such a refuse vehicle 10 may be a pure electric vehicle (e.g., within an internal combustion prime mover). In other such embodiments, an onboard engine (e.g., an internal combustion engine) provides some or all of the energy used to power the refuse vehicle 10 in some modes of operation. Such a refuse vehicle 10 may be a hybrid vehicle. Accordingly, in some embodiments, the energy system 20 may be at least partially recharged by the onboard engine, or by one or more other power generation devices (e.g., generators, regenerative braking, etc.).

Since the refuse vehicle 10 may, in some cases, be primarily powered via the energy system 20, it may be advantageous to keep the energy system 20 charged above a threshold value (e.g., above 50%). For an energy system that utilizes one or more batteries, for example, keeping the batteries above a certain charge level may increase battery life. Additionally, maintaining adequate charge levels can ensure that the refuse vehicle 10 is ready to perform operations at a moment's notice. As mentioned above, charging or otherwise maintaining the energy system 20 while coupled to the refuse vehicle 10 may reduce the time that the refuse vehicle 10 is useable. Configuring the energy system 20 to be quickly exchanged (e.g., swapped with a new and/or fully charged energy system) can thereby reduce downtime for the refuse vehicle 10 and, in some cases, may extend the operating life of both the refuse vehicle 10 and the energy system 20.

To facilitate quickly and efficiently removing and replacing (e.g., "hot-swapping") the energy system 20, a removal assembly may be configured to facilitate removal of the energy system 20 from the refuse vehicle 10. As will be described in more detail below, the removal assembly may be defined by a variety of elements configured to interact with one another to remove the energy system 20 from the refuse vehicle 10, and, in some embodiments, to transfer the energy system 20 to a charging location. According to various embodiments, the removal assembly may additionally be configured to attach the energy system 20 to the refuse vehicle 10. It will be appreciated that, while a removal assembly is described herein for removing or attaching the energy system 20 to the refuse vehicle 10, the removal assembly may also be configured to remove and/or attach a different primary power source (e.g., an internal combustion engine) from the refuse vehicle 10. In this manner, the removal assembly described below may facilitate the retrofitting of the energy system 20 to the refuse vehicle 10.

In some embodiments, the removal assembly may be entirely defined by removal elements supported by the refuse vehicle 10. In other embodiments, the removal assembly may additionally include one or more externally provided removal elements. In some such embodiments, the externally provided removal elements may be defined by existing devices and/or structures that are incorporated into, or utilized with, the removal assembly. In other embodiments, the externally provided removal elements may be defined by devices and/or structures that have been specifically made or adapted to be used in the removal assembly.

According to various embodiments, the removal assembly may be configured to remove the energy system from the refuse vehicle at a location that generally corresponds to the charging location. In some such embodiments, once the removal assembly has removed the energy system 20 from the refuse vehicle 10, the energy system 20 may remain attached to or otherwise supported by a portion of the removal assembly, such that the removal assembly also defines a charging station. For example, according to some embodiments, the removal assembly may include a support structure having a support surface that is configured to engage the removed energy system 20. In other embodiments, once the energy system 20 has been removed, the removal assembly may be configured to set the energy system 20 onto any number of existing, non-specific support surfaces (e.g., a floor surrounding the removal assembly, a loading dock surface, etc.) that extend adjacent the location of the removal assembly.

It will be appreciated that any of the removal assemblies described herein may be modified or adapted for the removal of energy systems (e.g., the energy system 20) mounted at any position on the refuse vehicle 10. For example, the removal assemblies may be configured to remove energy systems located on top of, alongside of, or below the refuse container 30, located between or on the frame 12 of the refuse vehicle, located above or behind the cab 16 of the refuse vehicle, located on a rear end of the refuse vehicle 10, etc. Accordingly, removal and/or replacement of all such configurations of the energy system 20 described above may be contemplated by the removal assemblies described below. FIGS. 10A-19, in particular, may include exemplary representations of such removal assemblies, but these representations are in no way intended to be limiting.

Figure 10A:
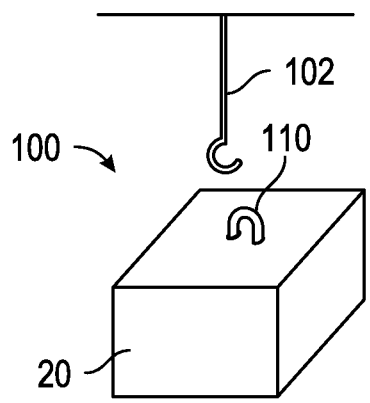
FIGS. 10A-19 illustrate various removal assemblies for the energy system of the refuse vehicle of FIG. 1, according to several exemplary embodiments.
Figure 10B:
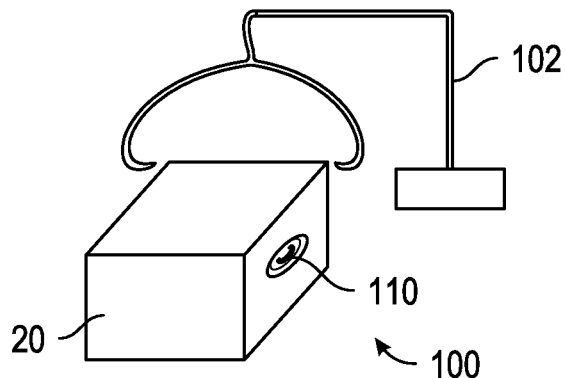
Figure 10C:
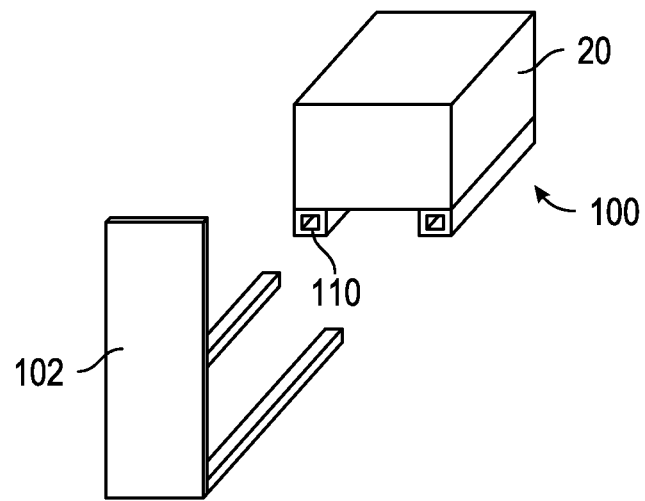

Referring now to FIGS. 10A-10C, exemplary embodiments of a removal assembly 100 comprising one or more externally provided removal elements are illustrated. As shown in FIGS. 10A-10C, according to some such embodiments, the externally provided removal elements may be defined by any number of various external lift devices 102, such as, e.g., a fork, hoist, crane, jack, boom, etc. In such embodiments, these lift devices 102 are configured to engage one or more engagement elements 110 provided along the energy system 20 to lift the energy system 20 off of the refuse vehicle 10. The engagement elements 110 may be defined by any number of, and combination of, different configurations. Non-limiting examples of such engagement element 110 configurations are representatively illustrated in FIGS. 10A-10C, and may include, e.g., handles (such as, e.g., shown in FIG. 10A); recesses (such as, e.g. shown in FIG. 10B); channels (such as, e.g., shown in FIG. 10C), etc. Upon removal of the energy system 20 from the refuse vehicle 10, the externally provided lift device 102 may additionally be configured to transfer the energy system 20 to a charging location, either directly by the lift device 102 itself, or via one or more transport devices to which the energy system 20 is transferred by the lift device 102.

As an example, an energy system 20 coupled to or integrated with the tailgate 34 of the refuse vehicle 10, as shown in FIGS. 7A and 7B, may be engage by a lift device 102 including a crane and/or a hook (e.g., as shown in FIG. 10A). The crane/hook may be lowered to engage a corresponding handle on the tailgate 34 in order to lift and remove the tailgate 34 from a rear end of the refuse vehicle 10. In this regard, the energy system 20 coupled to the tailgate 34 is also removed. A second tailgate including a second energy system (e.g., fully charged) may then be lowered via the lift device 102 into place on the rear end of the refuse vehicle 10 and secured. In this manner, the lift device 102 may facilitate the exchange of tailgate-mounted energy systems. In another example, an energy system 20 coupled to the top or sides of the refuse container 30 may be engaged by a lift device 20 including a crane/hook, such that the energy system 20 is lifted from the top or side of the refuse vehicle 10.

According to other embodiments, instead of relying on the availability and/or accessibility of an externally provided lift device 102, the removal assembly 100 may instead include one or more lift devices 102 provided as a part of the refuse vehicle 10. The lift device 102 may be defined by any number of powered and/or manually operated devices, such as, e.g. a jack lift, a lift cylinder, etc. In some embodiments, the lift device 102 may be releasably attached to the energy system 20, with the lift device 102 being disengaged from the energy system 20 prior to the refuse vehicle 10 being driven away from the removed energy system 20. In other embodiments, the lift device 102 may instead be fixedly attached to the energy system 20 and releasably attached to the refuse vehicle 10, with the lift device 102 remaining with the removed energy system 20 after the refuse vehicle 10 is driven away.

Figure 11A:
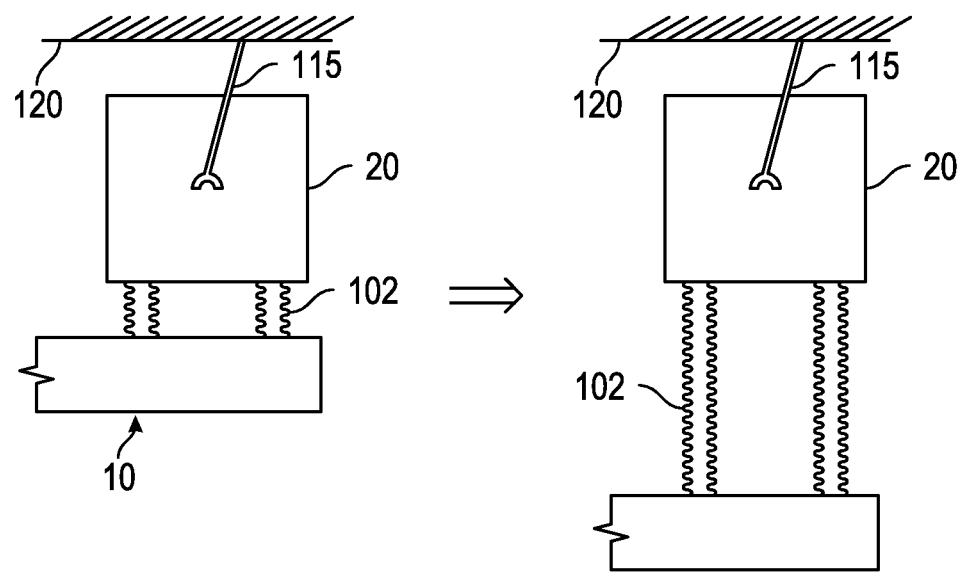
Figure 11B:
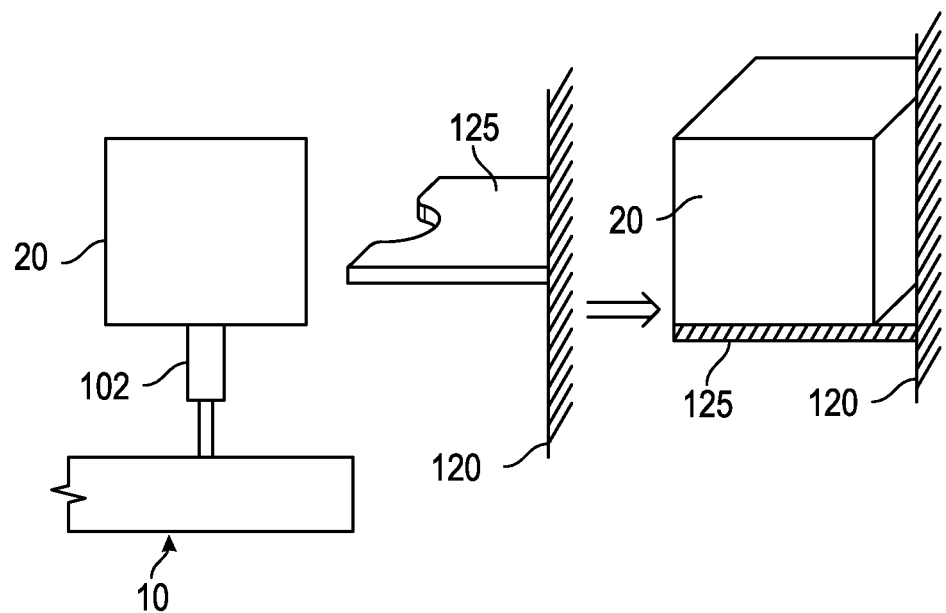

In embodiments in which the removal assembly 100 includes a lift device 102 provided by the refuse vehicle 10, the removal assembly 100 may additionally include one or more support structures 120 configured to support the energy system 20 such that the refuse vehicle may be driven away once the energy system 20 has been sufficiently raised by the lift device 102. Referring to FIGS. 11A and 11B, in some embodiments, the support structure 120 may be externally provided. In such embodiments, any number of different types of, or configurations of, engagement elements 110 may be used to attach the energy system 20 to the externally provided support structure 120. For example, as shown in FIG. 11A, in some embodiments, hook or handle shaped engagement elements 110 (see FIG. 10A) formed on one of the energy system 20 and the external support structure 120 may be configured to engage a corresponding retention elements 115 formed on the other of the external support structure 120 and energy system 20.

Turning to FIG. 11B, in other embodiments in which the removal assembly 100 includes a lift device 102 supported by the refuse vehicle 10, support of the energy system 20 in the elevated position relative to the refuse vehicle 10 may alternatively, or additionally, be accomplished by placing the energy system 20 atop an externally provided support structure 120. As illustrated in FIG. 11B, according to some embodiments, once the energy system 20 has been elevated by the lift device 102, a movable support structure 120 defining a support surface 125 may be positioned underneath the elevated energy system 20 so as to allow the energy system 20 to be supported thereon. In some embodiments, the movable support structure 120 may be entirely mobile, allowing the energy system 20 to be removed from the refuse vehicle 10 at any location at which the mobile support structure 120 may be used. In other embodiments the support structure 120 may be partially mobile, with support surface 125 of the support structure 120 being movable relative to a stationary portion of the support structure 120. In such embodiments, once the refuse vehicle 10 has been positioned near support structure 120, the support surface 125 may be moved as necessary into alignment with the energy system 20. As illustrated in FIG. 11B, in yet other embodiments, the support structure 120 may be entirely stationary, with the refuse vehicle 10 being brought into proximity with the support structure 120 and aligned with the support surface 125 of the support structure 120 to remove the energy system 20.

Figure 11C:
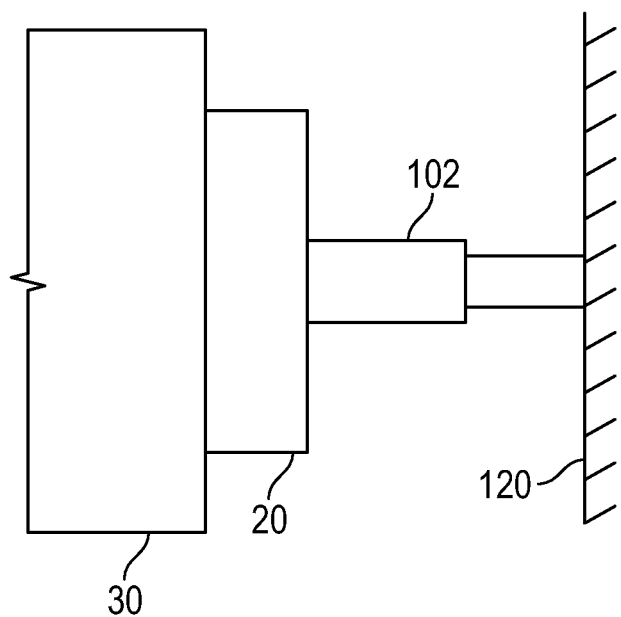

In other embodiments, the lift device 102 is supported by the externally provided support structure 120 rather than the refuse vehicle 10. As illustrated in FIG. 11C, for example, the support structure 120 and/or the energy system 20 may support a lift device 102, such as a pneumatic or hydraulic actuator, that may be extended from the support structure 120 (e.g., a wall) or the energy system 20 to engage the opposing support structure 120 or energy system 20 from a side. For example, the lift device 102 may be coupled to a movable or immovable support structure 120 and placed substantially in-line with the energy system 20, in this case an energy system 20 mounted on a side of the refuse vehicle 10. In this example, the support structure 120 may be moved into position or the refuse vehicle may be aligned with the support structure 120 (e.g., by driving into position) and the lift device may be extended to engage and remove the energy system 20.

Figure 11D:
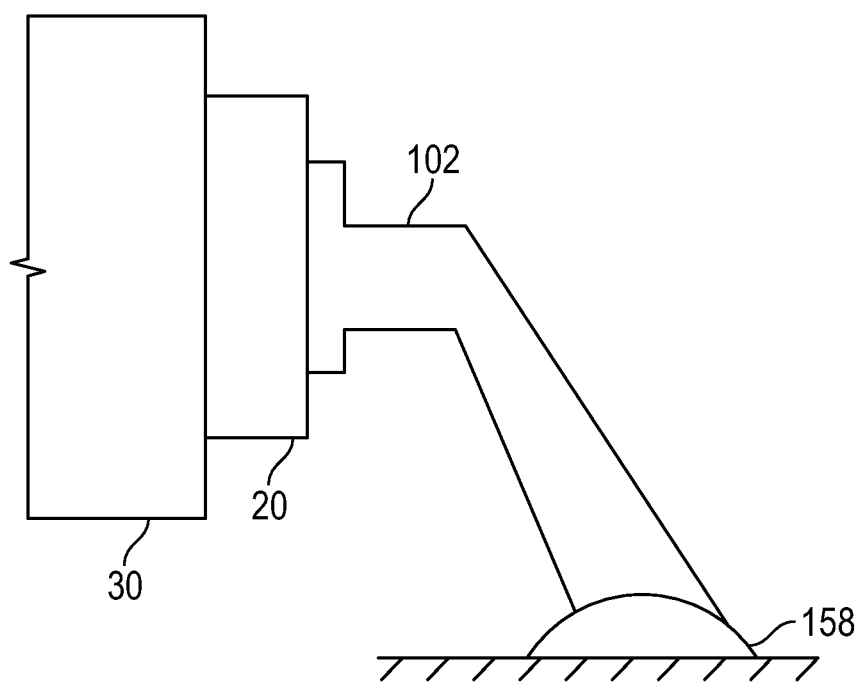

Turning to FIG. 11D, in some embodiments, the lift device 102 includes arm that is coupled to a hinged connector 158. The hinged connector 158 may also be coupled to the support structure 120 (e.g., a movable platform). When the energy system 20 (e.g., mounted to a side of the refuse vehicle 10) is in an adequate position/alignment with the lift device 102, the lift device 102 may be actuated (e.g., by rotating about the hinged connector 158) to engage the energy system 20. Once the energy system 20 is engaged and decoupled from the refuse vehicle 10, the lift device 102 may be actuated in an opposite direction to remove the energy system 20. In some embodiments, once the refuse vehicle 10 and/or the support structure 120 are moved out of alignment, the lift device 102 can be actuated in the first direction to place the energy system 20 on a secondary platform or vehicle for transportation, and/or may retrieve a new (e.g., charged) energy system.

Figure 12A:
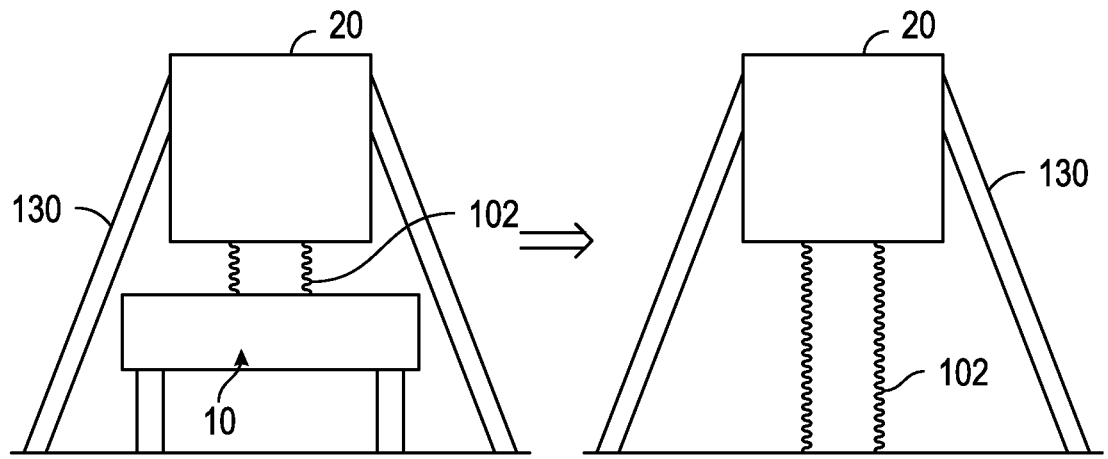
Figure 12B:
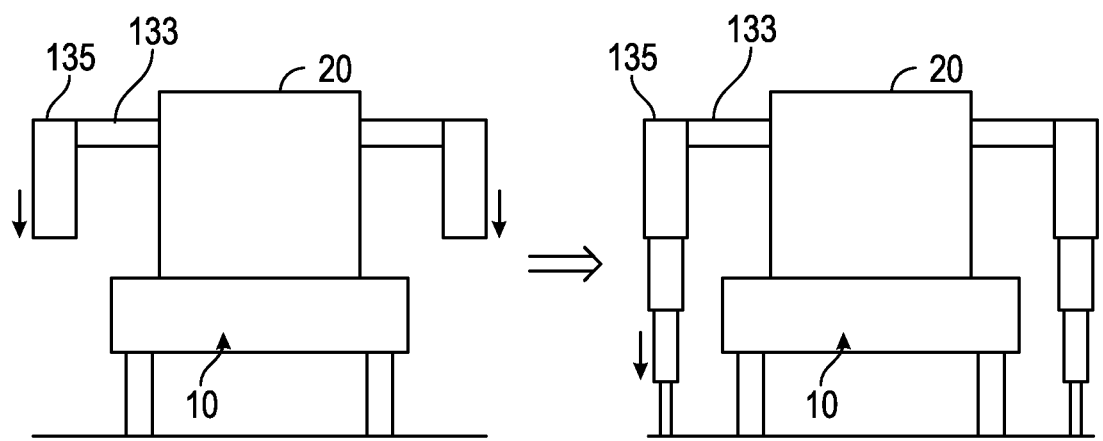

Referring to FIGS. 12A and 12B, according to some embodiments, in addition to the lift device 102 being supported by the refuse vehicle 10, the support structures 120 of the removal assembly 100 may additionally also be supported by the refuse vehicle 10 so as to define a removal assembly 100 entirely supported by the refuse vehicle 10. As will be understood, removal assembly 100 embodiments such as those illustrated in FIGS. 12A and 12B, which do not rely on any external removal elements to remove the energy system 20, advantageously free the energy system 20 to be removed from the refuse vehicle 10 at substantially any location and in any situation.

As shown in FIG. 12A, according to one embodiment of a self-supported removal assembly, the lift device 102 is initially operated to raise the energy system 20 to an elevated position, following which a pair of fixed or adjustable length leg elements 130 may be attached, pivoted downward, or otherwise engaged to the energy system 20 and so as to bring the lower surfaces of the leg elements 130 into contact with the ground on either side of the refuse vehicle 10. Once the leg elements 130 have been engaged with the ground, the refuse vehicle 10 may be driven away, leaving the energy system 20 supported by the leg elements 130. Such an arrangement may be beneficial for energy systems mounted on top of the cab 16 or the refuse compartment 30 of the refuse vehicle 10, for example.

Turning to FIG. 12B, in some self-supported removal assembly 100 embodiments, instead of the lift device 102 and the leg elements 130 being discrete removal elements, the lift device 102 and one or more of the leg elements 130 of the removal assembly 100 may instead (or additionally) be integrated into a single structure. As illustrated in FIG. 12B, the integrated leg/lift elements 135 may be defined by a telescoping, articulating, or otherwise expandable structure. When it is desired to remove the energy system 20, the expandable leg/lift elements 135 are actuated, thereby initiating an extension of the leg/lift elements 135. The leg/lift elements 135 continue to extend in a generally downwards direction until the leg/lift elements 135 come into contact with the ground, at which point continued extension of the leg/lift elements 135 causes the energy system 20 to be lifted upwards relative to the refuse vehicle 10. Once the energy system 20 has been raised to provide sufficient clearance relative to the refuse vehicle 10, the refuse vehicle 10 may be driven away, leaving the energy system 20 supported by the integrated leg/lift elements 135. As also shown in FIG. 12B, in some embodiments, fixed length or telescoping horizontal extension elements 133 may be attached on either side of the energy system 20 to extend the width of the energy system 20 such that the leg elements 130 engaged to the energy system 20 may clear the sides of the refuse vehicle 10 and be brought into contact with the ground.

According to some embodiments in which the removal assembly 100 includes a refuse vehicle 10 supported lift device 102 that remains attached to the energy system 20 upon removal of the energy system 20 from the refuse vehicle 10, once the energy system 20 has been engaged by the support structure 120 to support the energy system 20 so as to allow the refuse vehicle 10 to drive away, the lift device 102 may optionally be configured to be further extended until the lift device 102 is brought into contact with the ground, thus providing additional support for the weight of the removed energy system 20 in addition to that provided by the externally provided support structure 120 and/or the support structure 120 provided as part of the refuse vehicle 10 (e.g. leg elements 130 and/or leg/lift elements 135).

As will be understood, in embodiments in which the configuration of the refuse vehicle 10 is such that the energy system 20 does not need to be elevated relative to the refuse vehicle 10 to permit the refuse vehicle 10 to be driven away, the lift device 102 (shown in FIG. 12A) may optionally be omitted from the removal assembly 100. For example, in some such embodiments, the removal assembly 100 may instead rely solely on the energy system 20 being supported via the engagement between the engagement elements 110 (see FIG. 10C) provided along one of the energy system 20 and external support structure 120 and the retention elements 115 (see FIG. 11A) provided along the other of the energy system 20 and external support structure 120.

Figure 13:
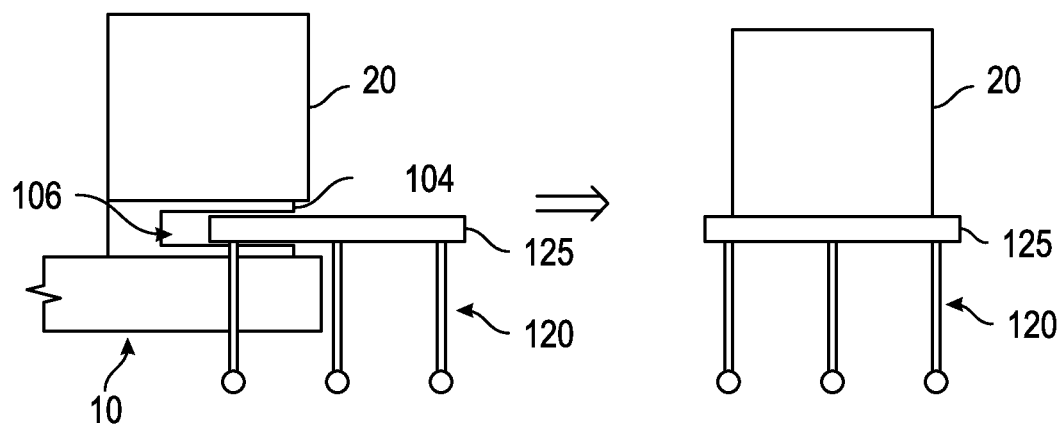

In other embodiments (see FIG. 13), instead of entirely omitting a lift device 102 from the removal assembly 100, the lift device 102 may instead be replaced by an elevated structure 104, with the energy system 20 being supported atop the elevated structure 104 such that a lower surface of the energy system 20 is positioned vertically above any structures of the refuse vehicle 10 rear portion, thereby allowing the refuse vehicle 10 to be driven away once that energy system 20 has been engaged to an appropriate support structure 120. As will be understood, in some such embodiments, the elevated structure 104 of the removal assembly 100 may be defined as a structure that is distinct and discrete from any of the mounting elements defining a frame of the energy system 20. In other embodiments, the elevated structure 104 may instead be defined by one or more of the mounting elements of the energy system 20. For example, as illustrated in FIG. 13, in some embodiments, a mobile support structure 120 including a support surface 125 may be positioned into a gap 106 defined by a U-shaped elevated structure 104 that is also defines a support plate atop which the energy system 20 is supported. According to yet other embodiments, the removal assembly may be defined by any number of other configurations and structures configured to move the energy system 20 along any one of, or any combination of, a lateral axis, a longitudinal axis, and/or a vertical axis relative to the refuse vehicle 10 in order to remove the energy system 20 from the refuse vehicle 10.

Figure 14:
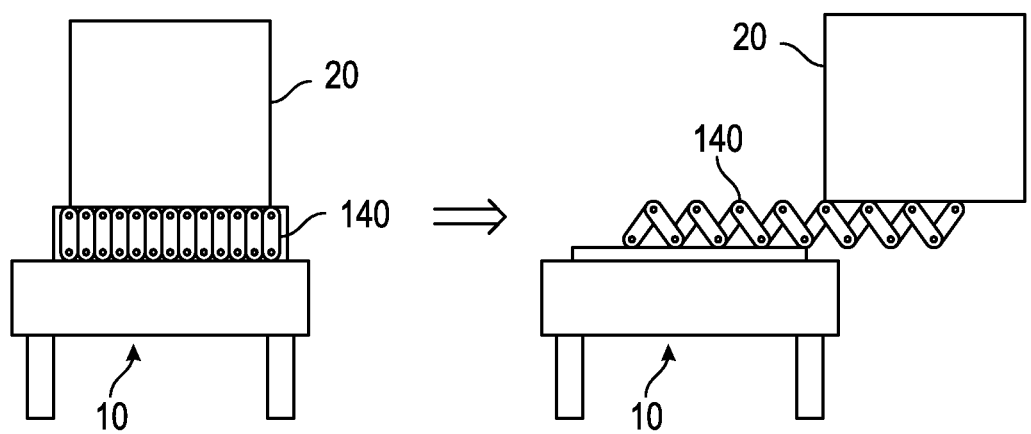

For example, as illustrated in FIG. 14, in some embodiments, the removal assembly may include a telescoping, articulating, or otherwise expandable structure 140 to which the energy system 20 is attached, and via which the energy system 20 may be removed from the refuse vehicle 10. When it is desired to remove the energy system 20, the expandable structure 140 is extended from its constrained, transport configuration into an extended removal configuration. As the expandable structure 140 is extended, the attached energy system 20 is moved outwards relative to the rear, left, and/or right side of the refuse vehicle 10, from where the energy system 20 may be transferred to a support surface 125 of a support structure 120 located adjacent a rear and/or side of the refuse vehicle 10.

Once the energy system 20 has been transferred to the support surface 125, the energy system 20 may be disengaged from the expandable structure 140 and/or the expandable structure 140 may be disengaged from the frame 12 (or other portion of the refuse vehicle 10 to which the expandable structure 140 is attached such as the refuse container 30), thereby removing the energy system 20 from the refuse vehicle 10 and allowing the refuse vehicle 10 to drive off. The support surface 125 onto which the energy system 20 is transferred may in some embodiments define the charging location of the energy system 20, or may be a temporary location from which the energy system 20 is subsequently transferred (using any number of or combination of devices) to the charging location.

Figure 15A:
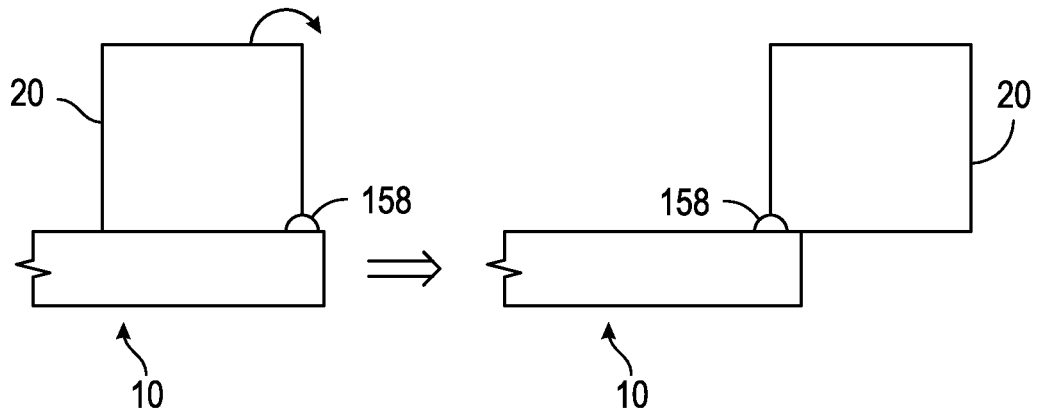
Figure 15B:
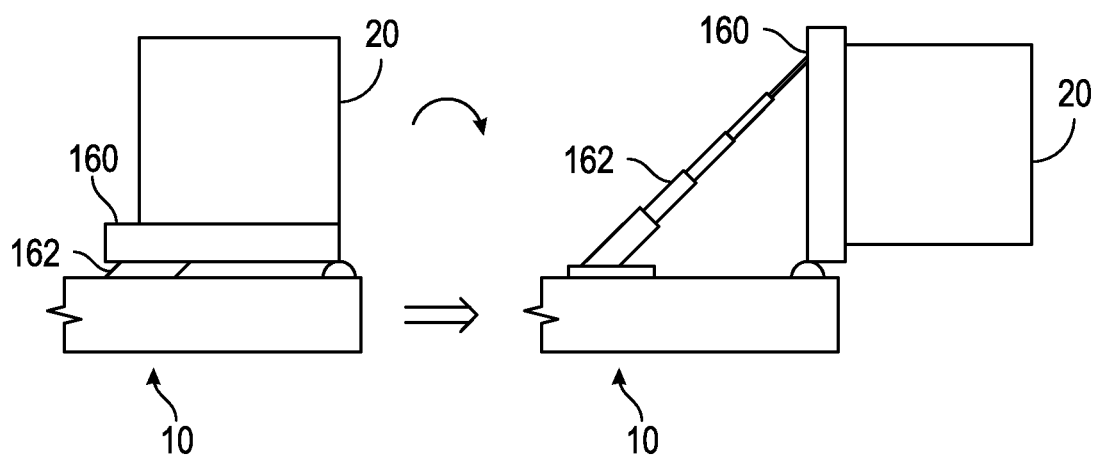
Figure 15C:
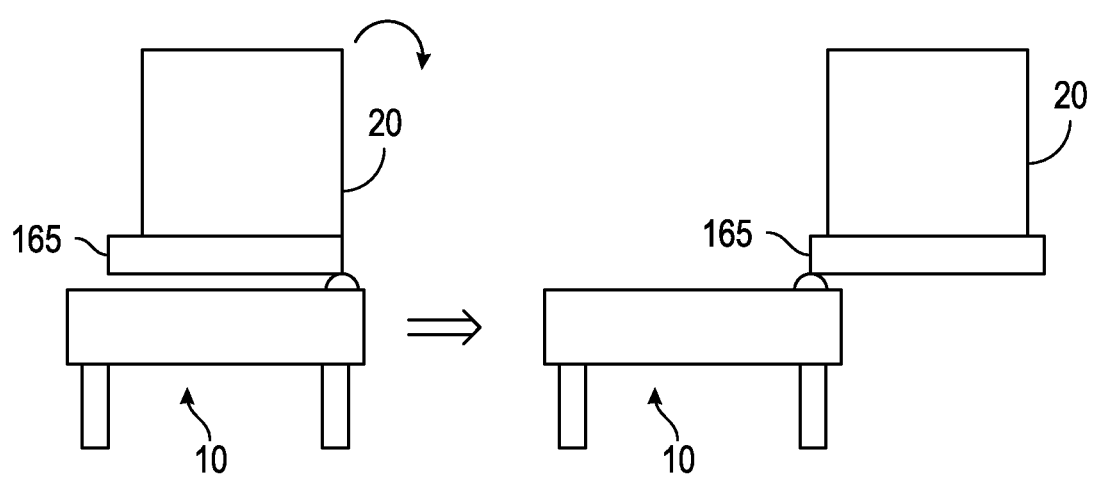

Referring to FIGS. 15A-15C, in other embodiments, the removal assembly may be configured to pivot the energy system 20 about the horizontal axis or the vertical axis to transfer the energy system 20 onto a support surface 125 of a support structure 120 extending along a rear and/or side of the refuse vehicle 10. As illustrated in FIG. 15A, according to some embodiments, the removal assembly may include a hinged connector 158 along which the energy system 20 is attached to a side or a rear edge of the energy system 20. When it is desired to remove the energy system 20, an edge of the energy system 20 located opposite an edge attached to the hinged connector 158 may be raised, causing the energy system 20 to be pivoted about the hinged connector and onto a support surface 125 provided alongside the refuse vehicle 10. Once the energy system 20 has been transferred to the support surface 125, energy system 20 may be disengaged from the hinged connector 158 and/or the hinged connector 158 is disengaged from the energy system 20.

As shown in FIG. 15B, according to yet other embodiments, the pivoting of the energy system 20 off of the refuse vehicle 10 and onto a support structure 120 may be accomplished via a lift plate 160 attached hingedly to the energy system 20 at a first end and attached to the energy system 20 via an extendable leg 162 at a second end. The energy system 20 is supported on the lift plate 160 such that upon actuation of the lift plate 160 to extend the extendable leg, the lift plate 160 (with attached energy system 20) is pivoted relative to the refuse vehicle 10.

As shown yet other embodiments (not shown), the removal assembly 100 may include a pin provided on one or both of a left side and a right side and/or on one or both of a front surface and rear surface of the energy system 20. The pin is configured to travel along an arcuate groove defined by a side wall structure, thereby facilitating the pivoting transfer of the energy system onto a support surface 125 provided alongside the refuse vehicle 10. Once the energy system 20 has been transferred to the support surface 125, the energy system 20 may be disengaged from the pin.

In other embodiments, instead of pivoting the energy system 20 about a horizontal axis to remove the energy system 20 from the refuse vehicle 10, the energy system 20 may instead be removed from the refuse vehicle 10 by pivoting the energy system 20 relative to the vertical axis. As shown in FIG. 15C, according to one such embodiment, the energy system 20 may be attached to the refuse vehicle 10 via a pivoting plate 165. In some embodiments, the pivoting plate 165 may be a structure discrete from and independent of the energy system 20. In other embodiments, the pivoting plate 165 may define an additional mounting element of the energy system 20. The pivoting plate 165 may be pivotally attached to the refuse vehicle at one or more locations about the perimeter of the pivoting plate 165 to allow the pivoting plate 165 and attached energy system to be moved outwards relative to a side and/or rear of the refuse vehicle 10. As will be understood, in embodiments in which the pivoting plate 165 is pivotally attached to the refuse vehicle 10 at one or more locations, a user may selectively disengage all but a single pivotable connection depending on the location of the support surface 125 relative to the refuse vehicle 10, thus allowing the pivoting plate 165 to be used to remove the energy system 20 irrespective of the positioning the refuse vehicle 10 relative to the support structure 120.

According to some embodiments, the energy system 20 is configured to be removed from the refuse vehicle 10 by sliding, pushing, rolling or otherwise moving the energy system 20 laterally off of the energy system 20 and onto a support surface 125 of a support structure 120 of the removal assembly 100. More specifically, in such embodiments, when it is desired to remove the energy system 20 from the refuse vehicle 10, the refuse vehicle 10 is brought into proximity to the support structure 120 (e.g., by backing the refuse vehicle 10 up towards the support structure 120, by driving the refuse vehicle 10 alongside the support structure 120, by bringing a mobile support structure 120 towards the refuse vehicle 10, etc.). Once the rear of the refuse vehicle 10 and the support structure 120 have been so aligned and the energy system 20 unsecured, the energy system 20 is moved off of the refuse vehicle 10 and onto the support structure 120.

Figure 16A:
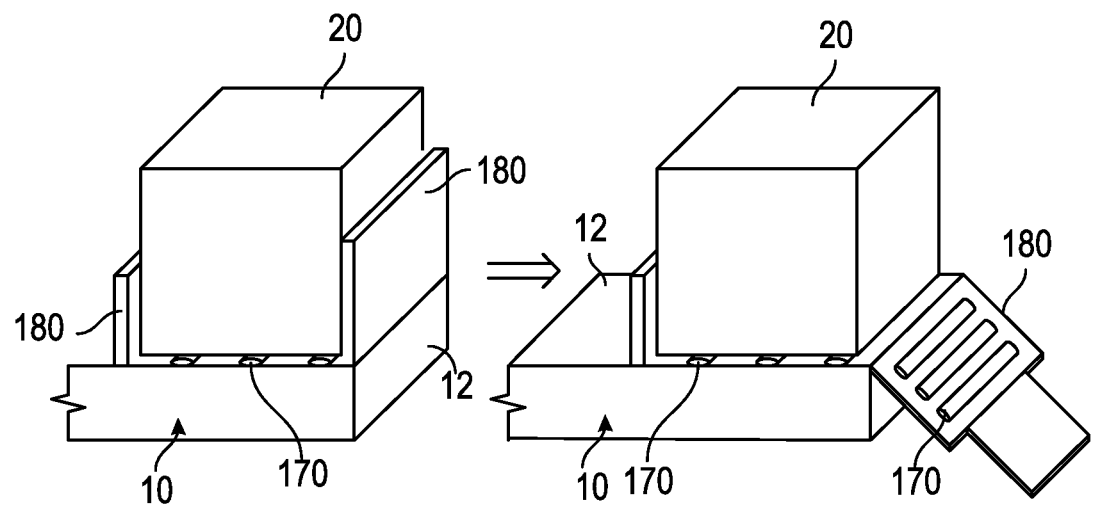
Figure 16B:
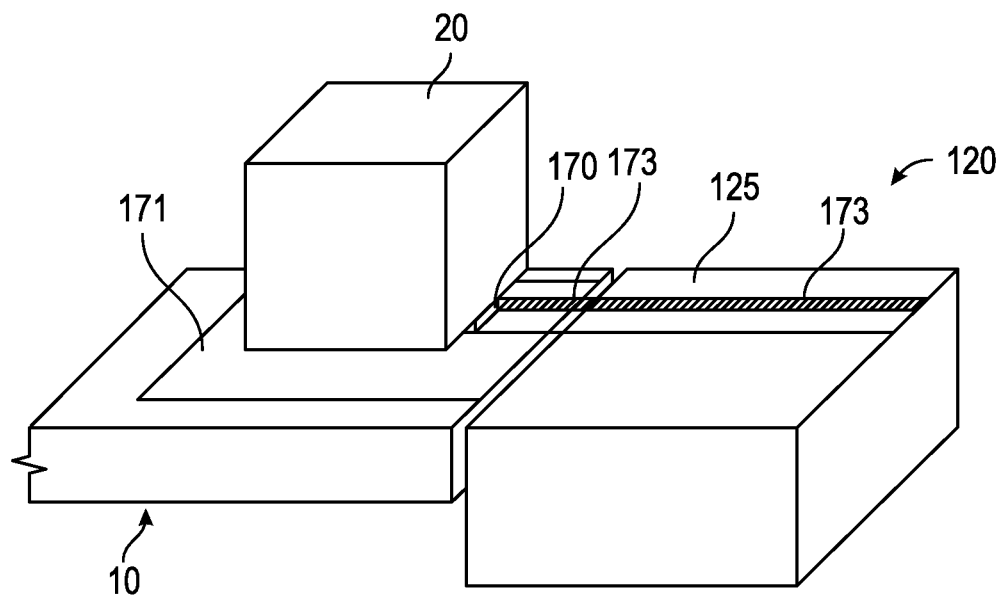

According to various such embodiments (see FIG. 16A), one or more transfer elements 170 configured to facilitate the lateral movement of the energy system 20 off of the refuse vehicle 10 may be provided along one or both of the energy system 20 and the refuse vehicle 10. For example, as shown in FIGS. 16A and 16B, according to various embodiments, the transfer elements 170 may be defined by structures such as wheels, linear bearings, rollers, or any other number of rolling structures configured to allow the energy system 20 to be rolled across a surface. In other embodiments, the transfer elements 170 may additionally, or alternatively, be defined by a continuous track or belt assembly.

As shown in FIG. 16A, according to some embodiments, the transfer elements 170 may be configured to allow the energy system 20 to be moved in an unrestricted, or substantially unconstrained manner relative to the refuse vehicle 10. In other embodiments, such as, e.g. illustrated in FIG. 16B, transfer elements 170 provided on one of the energy system 20 and the refuse vehicle 10 may alternatively be configured to travel along a track 173 or other structure formed on the other of the energy system 20 and refuse vehicle 10, and which is configured to guide the movement of the transfer elements 170 along a predetermined path. As also shown in FIG. 16B, according to some such embodiments, a support structure 120 of a removal assembly may additionally include transfer element 170 or a track 173 formed about the support surface 125, so as to further facilitate removal of the energy system 20.

In some embodiments, transfer elements 170 can include wheels, bearings, rollers, a track, etc., attached to both the refuse vehicle 10 and the energy system 20, such that the energy system 20 can be manually removed from the refuse vehicle 10. Considering an energy system 20 mounted alongside of a refuse vehicle 10 (e.g., along a side of the refuse container 34 as shown in FIGS. 8A and 8B), for example, the transfer elements 170 may allow a user or any external system to push/pull the energy system along an axis parallel to the longitudinal axis of the refuse vehicle 10. In other words, the energy system 20 may be pushed/pulled/slid towards the front of rear of the refuse vehicle 10 via the transfer elements 170 in order to remove the energy system 20.

In some situations, it may not be possible to bring the refuse vehicle 10 and the support structure 120 close enough to one another so as to define a substantially uninterrupted surface extending between the upper surface of the energy system 20 and the support surface. For example, the lower surface of the energy system 20 may extend at a different height than the support surface 125; the configuration of the support structure 120 and/or the refuse vehicle 10 may prevent the refuse vehicle 10 and the support structure 120 from being brought into close proximity with one another; etc. Accordingly, in some embodiments (see FIG. 16A), an optional extension surface 180 may be provided to bridge any gap between the support surface 125 and the energy system 20, thus providing a substantially continuous surface along which the energy system 20 may be moved. According to some embodiments, the extension surface 180 may optionally include one or more of the same transfer elements 170 as those provided along the energy system and/or energy system 20.

In some embodiments, the extension surface 180 may be provided as an unattached, free structure. In other embodiments, the extension surface 180 may be attached along at least a first end to a structure of the refuse vehicle 10. For example, as illustrated in FIG. 16A, in some embodiments, the extension surface 180 may be attached to a portion of the energy system 20, and in some embodiments, may additionally define a portion of the energy system 20. During use of the refuse vehicle 10, the extension surface 180 may be arranged to extend relative to the energy system 20 in such an arrangement as to prevent movement of the energy system 20 relative to the refuse vehicle 10. When it is desired to remove the energy system, the extension surface 180 may be unsecured, resulting in both the energy system 20 being freed to be removed from the refuse vehicle 10 and, if desired, in the extension surface 180 being capable of being used to bridge a gap extending between the refuse vehicle 10 and the support structure 120.

As described herein, according to various removal assembly 100 embodiments, the energy system 20 is configured to be removed from the refuse vehicle 10 by moving the energy system 20 in a specific direction (e.g. rearwards, to a side, etc.) relative to the refuse vehicle 10. As will be understood, in certain situations, it may not be possible to align the refuse vehicle 10 relative to the support structure 120 in such a manner as wound be required to remove the energy system 20 from the refuse vehicle 10 using the removal assembly 100. As such, according to various embodiments, the energy system 20 may be configured to rotatably attach the energy system 20 to the refuse vehicle 10, such that the energy system 20 may be rotated as needed to align the one or more removal assembly 100 components to allow the energy system 20 to be removed from the refuse vehicle.

Figure 17:
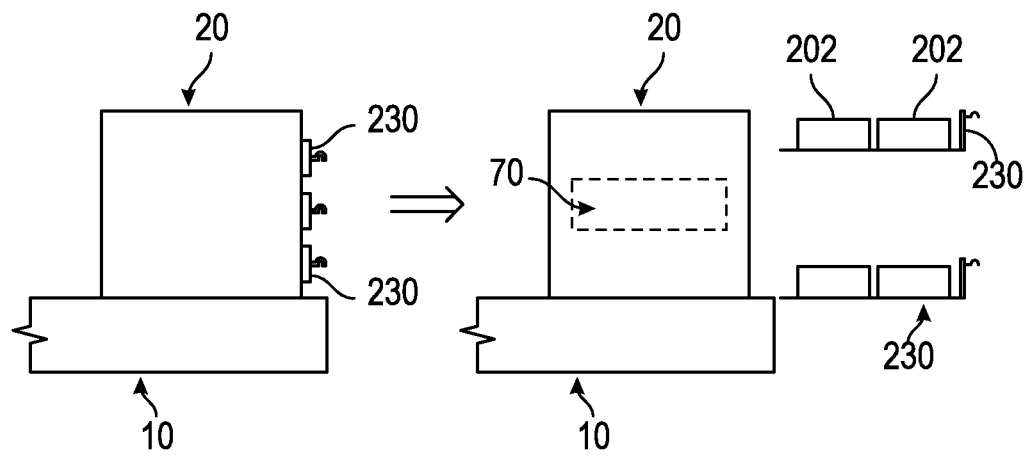

In some embodiments, the energy system 20 is defined by one or more individual battery assemblies. As shown in FIG. 17, the energy system 20 may be defined by two or more stacked layers of battery assemblies 202, with one or more battery assemblies 202 being supported by support shelves 230. In some embodiments, the removal assembly may include transfer elements (e.g., transfer elements 170 as described with reference to FIGS. 16A and 16B) defined by tracks attached to the walls extending between adjacent support shelves 230. Formed along the sides of the battery assemblies 202 may be transfer elements defined by one or more rollable elements configured to slide along the tracks attached to walls of a frame of the energy system 20. When it is desired to charge the energy system 20, one or more of the battery assemblies 202 may be removed from the energy system 20 by sliding the battery assemblies 202 outward from the energy system 20 and onto a support surface. In some embodiments, at least one battery assembly 202 is left attached to the energy system 20 to define a secondary (e.g., backup) battery 70. In a subsequent charging event, the one or more battery assemblies 202 that defined the secondary battery 70 may be removed for charging, while leaving one or more of the previously charged battery assemblies 202 to define the secondary battery 70. The secondary battery 70 may allow for at least a limited range of operations of the refuse vehicle 10 when one or more battery assemblies 202 are charging According to various embodiments, besides providing a removal assembly 100 configured to allow the selective removal of a portion of the battery assemblies 202 from the refuse vehicle, the refuse vehicle 10 may additionally be provided with one or more features to prevent or avoid situations in which the refuse vehicle 10 is left without sufficient power required for its operation. In some embodiments, the energy system 20 and/or removal assembly 100 may be configured to as to prevent, or initially block, a user from removing all of the battery assemblies 202 from the energy system 20, so as to avoid an unintentional situation in which the refuse vehicle 10 is left without power. For example, in the embodiment described with reference to FIG. 17, according to some embodiments, the removal assembly 100 and/or energy system 20 may include one or more features that would prevent all of the battery assemblies 202 being slid outwards from the shelves via the removal assembly 100 transfer elements 170 simultaneously unless overridden by a user. In such an embodiment, upon removal of the penultimate battery assembly 202 from its support shelf 230, a lock preventing movement of the transfer elements of the remaining, unremoved battery assembly 202 may be triggered, thereby preventing the last battery assembly 202 from being removed from the refuse vehicle 10.

Figure 18A:
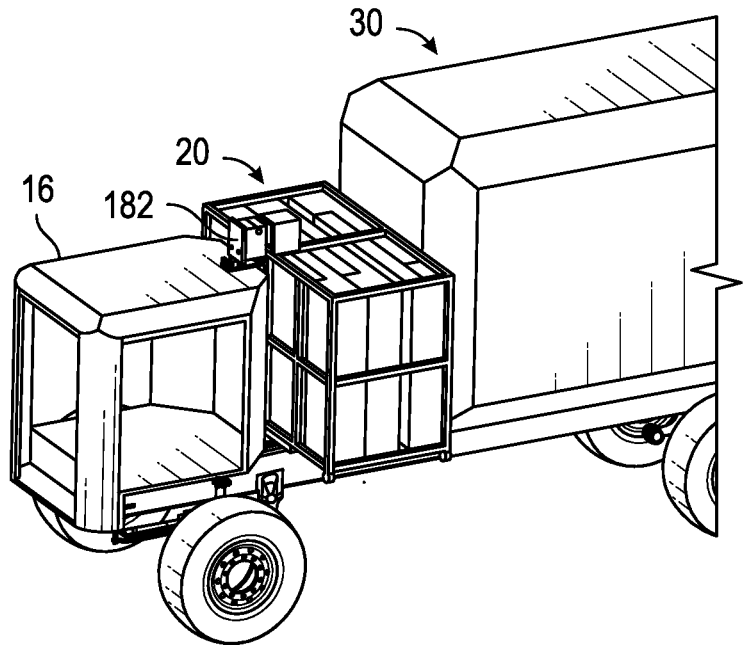
Figure 18B:
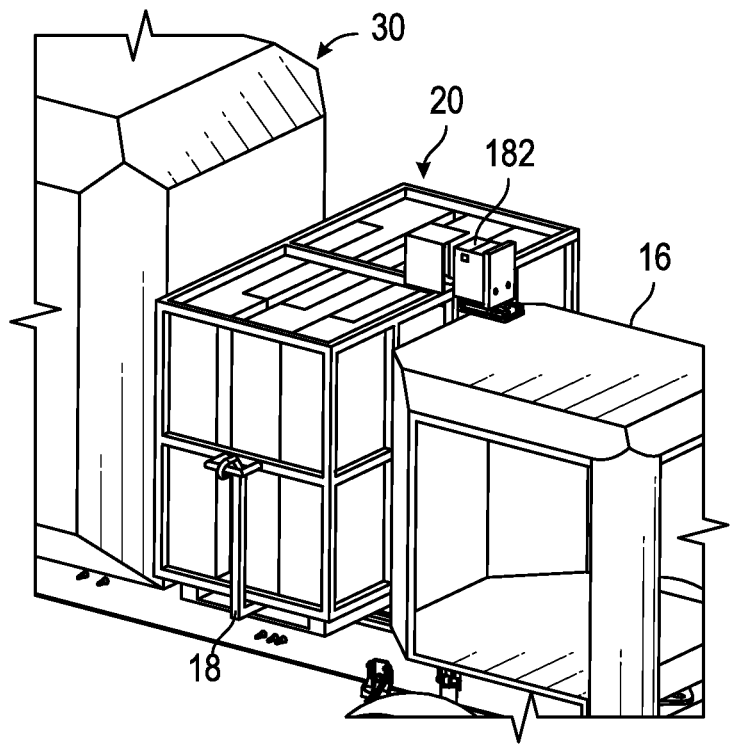

Referring now to FIGS. 18A-18B, according to some embodiments, the energy system 20 may be secured to the refuse vehicle by a load handling system (LHS). In some embodiments, the LHS is a hydraulic or electric hooklift system for hooking, lifting, and/or hoisting the energy system 20 onto the rear end of the refuse vehicle or another position along the refuse vehicle. The LHS may include at least a controller 182 and an arm 184. The LHS may also include a series of hydraulic actuators configured to actuate the arm 184 (not shown).

In some embodiments, the arm 184 may be configured to actuate to engage the energy system 20. For example, the arm 184 may pivot at one or more joints and/or about one or more horizontal or vertical axes to engage the energy system 20. In such embodiments, a hook or other suitable member at a distal end of the arm 184 may engage a corresponding ring, hook, etc. on the energy system 20. The arm 184 may then actuate to move the energy system 20 onto the refuse vehicle.

As shown in FIGS. 18A-18B, in some embodiments, the energy system 20 may be located behind the cab 16 of the refuse vehicle rather than at a rear end, side, or top of the refuse vehicle. The energy system 20 may be behind the cab 16 for rear loading refuse vehicles, for example. In such embodiments, the LHS may be configured to engage the energy system 20 from a left or right side of the vehicle. For example, as shown in FIG. 18B, the energy system 20 may be loaded and/or unloaded from the refuse vehicle from a left (i.e., driver's side) of the refuse vehicle. It will be appreciated, however, that the energy system 20 may be located at other points of the refuse vehicle and accordingly, the LHS may be configured to load and/or unload the energy system 20 from any side of the refuse vehicle.

Figure 19:
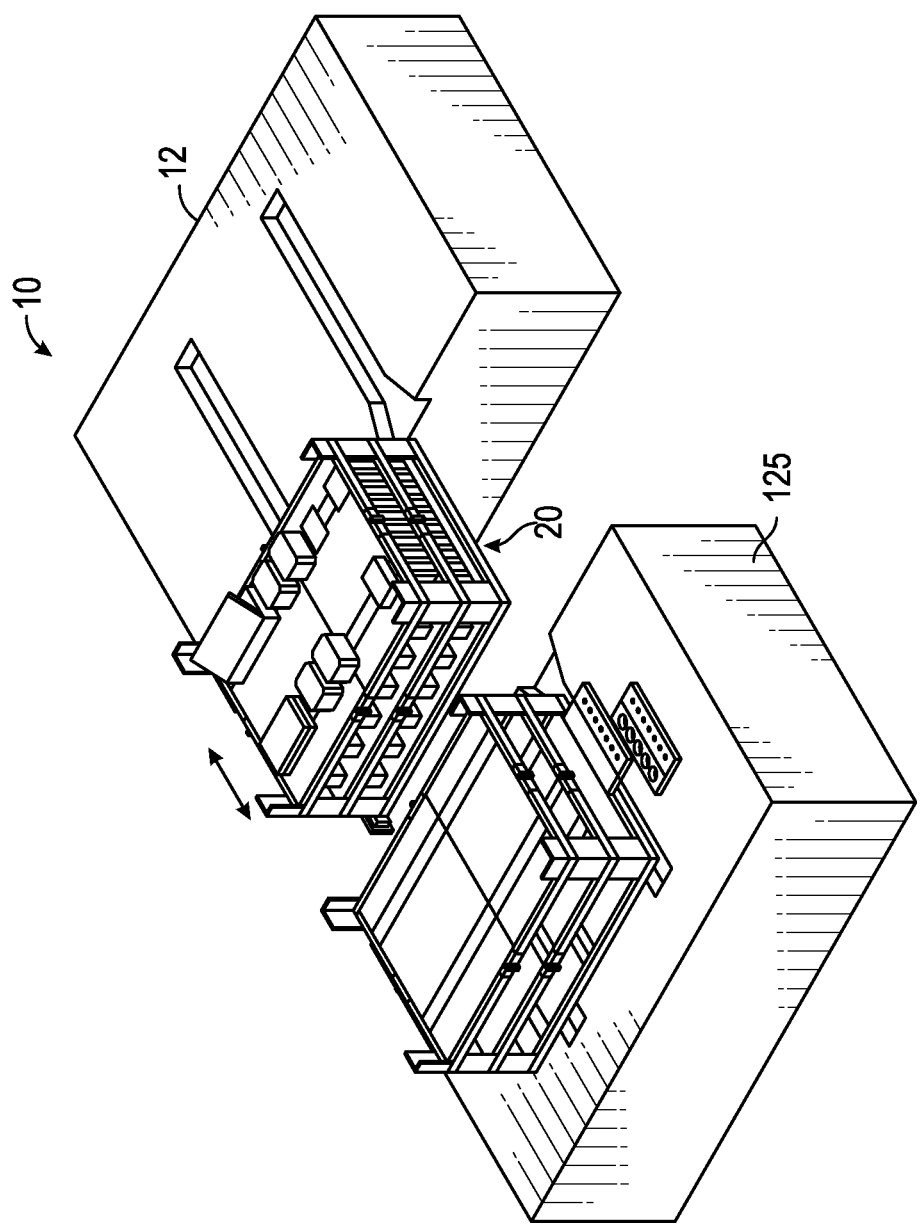

In some embodiments, the energy system 20 may be lifted, slid, or otherwise moved on to or off of the refuse vehicle 10, as shown in FIG. 19. In such embodiments, for example, the refuse vehicle 10 may pull into a designated spot (e.g., a loading bay) within proximity of the support surface 125 (e.g., a loading dock, a raised platform, etc.). In some embodiments, the energy system 20 may be transferred between the refuse vehicle 10 and the support surface 125 by the transfer element or a track, as described above. In other embodiments, another mechanism may be used to slide or move the energy system 20 between the support surface 125 and the refuse vehicle 10. For example, any of the methods and systems described herein may be used to transfer the energy system 20 between the support surface 125 and the refuse vehicle 10, as shown in FIG. 19.

Figure 20A:
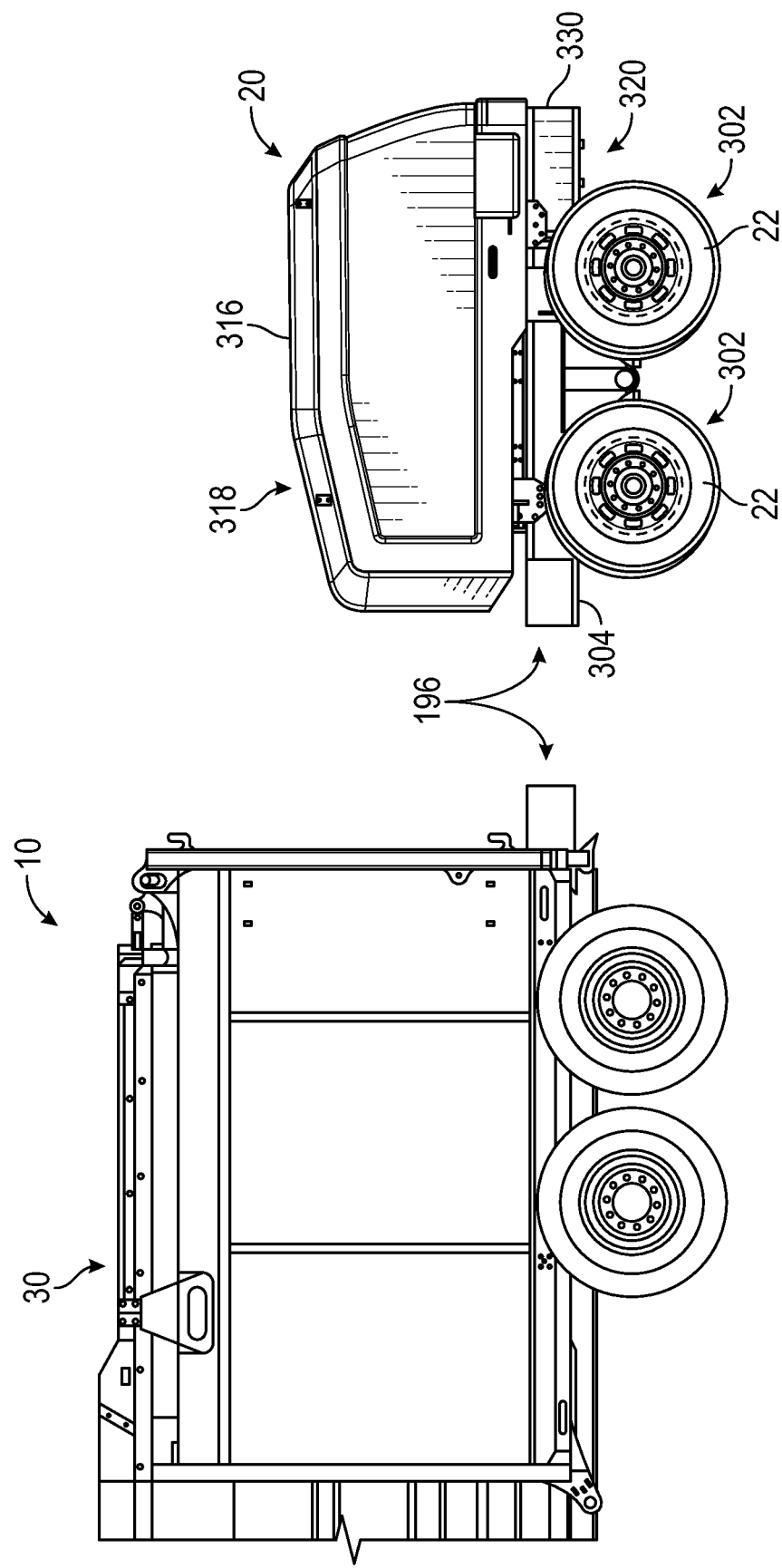
FIGS. 20A-20C illustrate the energy system configured as a trailer, according to several exemplary embodiments.
Figure 20B:
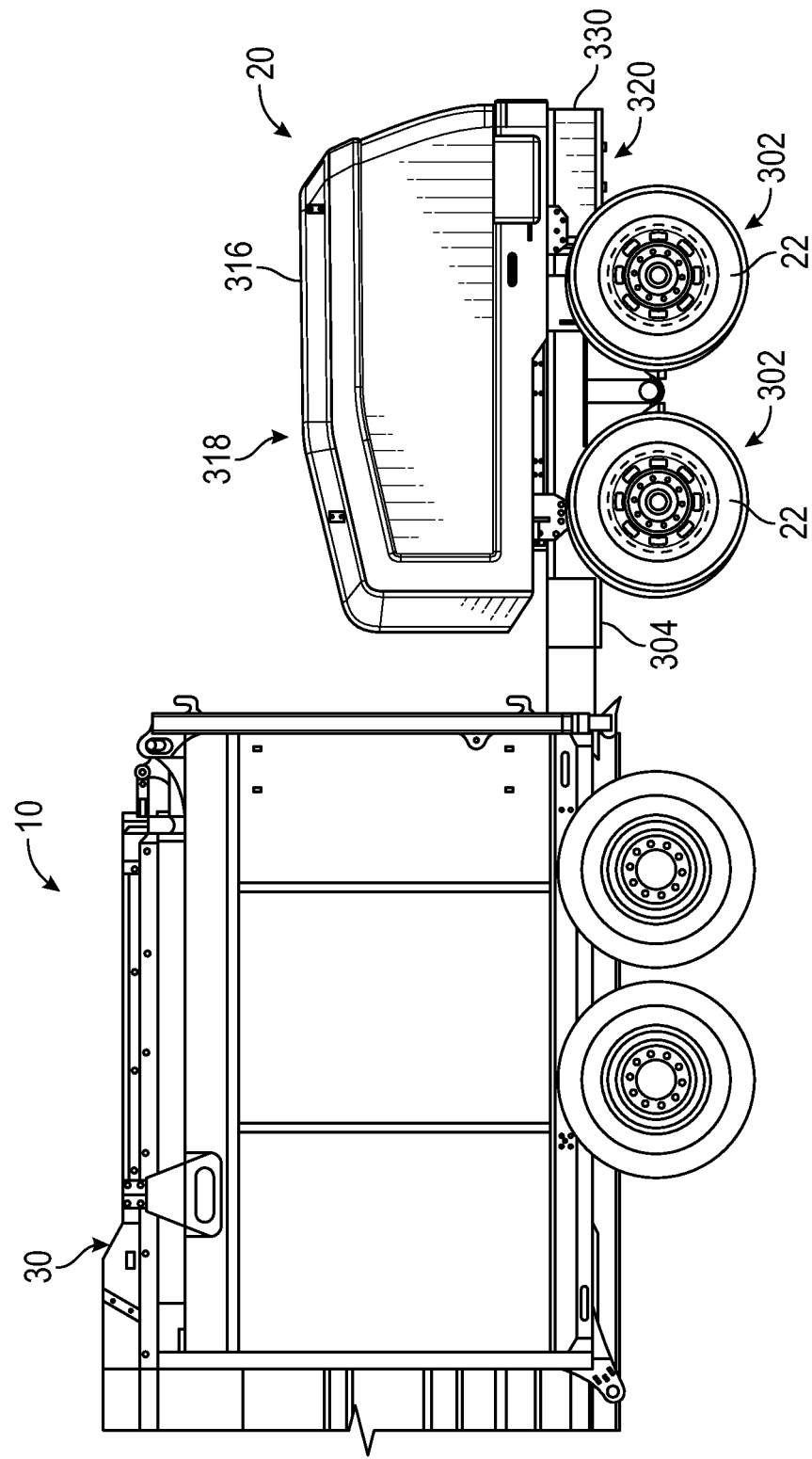
Figure 20C:
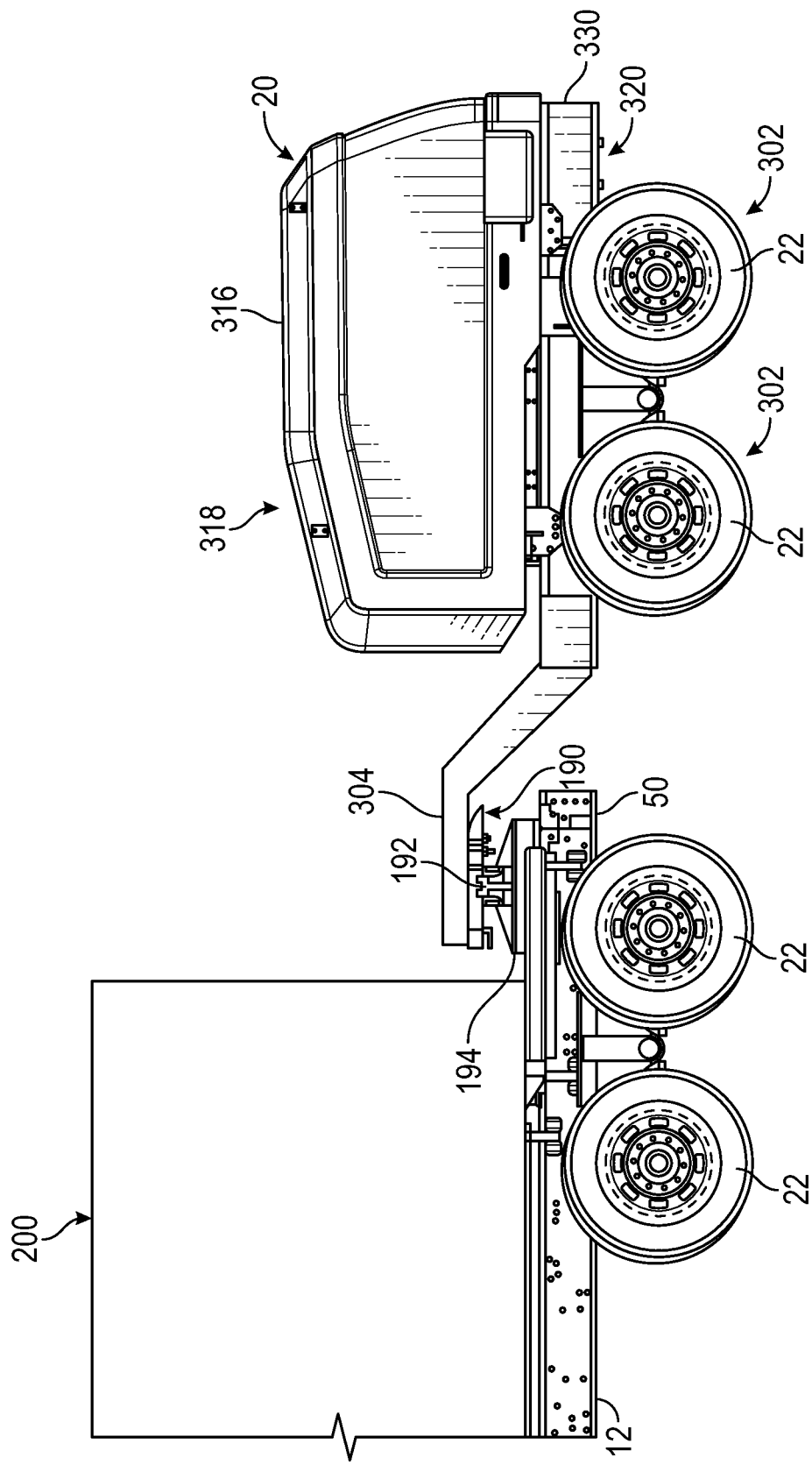

Referring now to FIGS. 20-20C, the energy system 20 may be configured to be carried (i.e., transported) by a trailer, in some embodiments. As shown in FIGS. 20A-20C, for example, the energy system 20 may be fixedly or removably coupled to an energy system trailer 318. In such embodiments, coupling the energy system 20 to the energy system trailer 318 may allow the energy system 20 to be selectively coupled to the refuse vehicle 10. In this manner, the energy system 20 may be decoupled from the refuse vehicle 10 in order to charge or replace the energy system 20. Advantageously, the energy system trailer 318 may provide a quick and easy method for replacing the energy system 20 when it is depleted. For example, during operations of the refuse vehicle 10, a low or depleted energy system 20 may be replaced by decoupling a first energy system trailer 318 from the refuse vehicle 10 and subsequently coupling a second energy system trailer 318 to the refuse vehicle 10.

The energy system trailer 318 includes a chassis 320 configured to support the various components of the energy system 20. The chassis 320 includes a pair of frame rails 330 coupled with intermediate cross members, according to an exemplary embodiment. As shown in FIG. 20A, the frame rails 330 extend in a generally-horizontal and longitudinal direction (e.g., extend within 10 degrees of perpendicular relative to a vertical direction, extend within ten degrees of parallel relative to a ground surface when the energy system trailer 318 is positioned on flat ground, etc.) between a front end and a rear end of the energy system trailer 318. The frame rails 330 may be elongated "C"-channels or tubular members, according to various exemplary embodiments. In other embodiments, the frame rails 330 include another type of structural element (e.g., monocoque, a hull, etc.). In still other embodiments, the frame rails 330 include a combination of elongated C-channels, tubular members, a monocoque element, and/or a hull element. In some embodiments, the energy system 20 may be attached to the frame rails 330 of the energy system trailer 318 permanently (e.g. via welding) or non-permanently (via any number of known attachment arrangements).

The energy system trailer 318 is shown to include a pair of tractive assemblies, shown as trailer axle assemblies 302. The trailer axle assemblies 302 may be spaced apart so that the energy system trailer 318 may be freestanding when decoupled from the refuse vehicle 10. In some embodiments, the trailer axle assemblies are non-driven or non-powered. In other embodiments, the trailer axle assemblies 302 may be driven, such as by a drive system of the refuse vehicle 10 or by a separate motor or prime mover of the energy system trailer 318. For example, in some embodiments, the energy system trailer 318 may include one or more motors (e.g., electric motors) for driving the trailer axle assemblies 302.

The trailer axle assemblies 302 may include brakes (e.g., disc brakes, drum brakes, air brakes, etc.), gear reductions, steering components, wheel hubs, wheels, tires, and/or other features. As shown in FIG. 20A, for example, the trailer axle assemblies 302 each include tractive elements, shown as wheels 22. In other embodiments, the trailer axle assemblies 302 include a different type of tractive element (e.g., a track, etc.). In some embodiments, the trailer axle assemblies 302 may be coupled to the frame rails 330 via a suspension system. In such embodiments, the suspension system may include numerous components including shocks, struts, springs, leaf springs, etc.

In some embodiments, the energy system trailer 318 may be configured as a non-pivoting trailer, as shown in FIGS. 20A and 20B. In other words, the energy system trailer 318 may be fixedly and removably coupled to the refuse vehicle 10 such that the energy system trailer 318 has a fixed position and orientation relative to the refuse vehicle 10. In some embodiments, the energy system trailer 318 may be configured without a tongue 304, as shown in FIG. 20C described below. In such embodiments, the frame rails 330 of the energy system trailer 318 may align with the frame rails 50 of the refuse vehicle. The frame rails 330 may be coupled to the frame rails 50 by any suitable method. For example, the frame rails 330 may be bolted to the frame rails 50 or may be connected by a coupling assembly. In other embodiments, where the energy system trailer 318 includes the tongue 304, the tongue 304 may include a coupling assembly 196 that selectively and removably couples the energy system trailer 318 to the refuse vehicle 10.

The coupling assembly 196 may include any suitable components for removably coupling the energy system trailer 318 to the refuse vehicle 10. In one non-limiting example, the coupling assembly 196 may couple energy system trailer 318 to the refuse vehicle 10 in a manner similar to a removable gooseneck trailer. In this example, a portion of the coupling assembly 196 connected to a rear end of the refuse vehicle 10 may include a hook, latch, or locking tab assembly, while a portion of the coupling assembly 196 connected to a corresponding end of the chassis 320 of the energy system trailer 318 may include a plurality of alignment protrusions. The energy system trailer 318 may then be coupled to the refuse vehicle 10 by aligning the alignment protrusions with corresponding openings in the portion of the coupling assembly 196 connected to a rear end of the refuse vehicle 10 and engaging the hook, latch, or locking tab assembly (e.g., manually such as by inserting a rod, by engaging an actuator, hydraulically, etc.).

When configured as a non-pivoting trailer, as shown in FIGS. 20A and 20B, the energy system trailer 318 may act as a dolly, similar to a load span tag axle. The energy system trailer 318 may act to distribute the weight of the refuse vehicle 10 and the energy system 20 more evenly and/or across additional axles (e.g., trailer axle assemblies 302). In some embodiments, the weight distribution and additional axle assemblies associated with the energy system trailer 318 may allow for heavier energy systems (e.g., energy system 20) such that the capacity of the energy system 20 may be increased, leading to increased operational capacity (e.g., increased runtime).

As shown in FIG. 20C, for example, the energy system trailer 318 may also be configured to be rotatably and removably coupled to the refuse vehicle 10. In this example, the energy system trailer 318 includes a frame member shown as tongue 304, mentioned above. In various embodiments, the tongue 304 may be fixed, detachable, or foldable and may be configured in any suitable style. An end of the tongue 304 may include a first coupling member 192, such as a kingpin or pintle, that may selectively engage with a second coupling member 194 (e.g., a fifth-wheel coupling or lunette ring) to rotatably couple the first coupling member 192 to the second coupling member 194 about a vertical axis. Together, the first coupling member 192 and the second coupling member 194 form a coupling assembly 190 that allows the energy system trailer 318 to pivot with respect to the refuse vehicle 10. In some embodiments, the coupling assembly 190 is powered (e.g., hydraulically, electrically, etc.) to couple the energy system trailer 318 to the refuse vehicle 10. In other embodiments, the coupling assembly 190 is not powered and may be manually engaged/disengaged to couple/decouple the energy system trailer 318 and the refuse vehicle 10.

It will be appreciated that other configurations for coupling the energy system trailer 318 to the refuse vehicle 10 are contemplated herein. For example, a rear-load refuse vehicle may require a modified version of the rotatable or non-rotatable couplings discussed above. In some embodiments, such as a rear-loading refuse vehicle, the energy system trailer 318 may include a tongue 304 that is long enough to allow a user (e.g., an operator of the refuse vehicle 10) to access an opening at the rear of the refuse vehicle 10 in order to empty a refuse can. In another example, certain refuse vehicles may not include extra space at the rear end of the refuse vehicle to mount a trailer hitch (e.g., a fifth-wheel) that requires a significant amount of space. Accordingly, the first coupling member 192 may be a pintle or ball hitch that can be mounted to a side or underneath the rear end of the refuse vehicle. In this case, the second coupling member 194 may be a lunette ring or hitch configured to engage the first coupling member 192 to connect the energy system trailer 318 to the refuse vehicle 10.

Figure 21A:
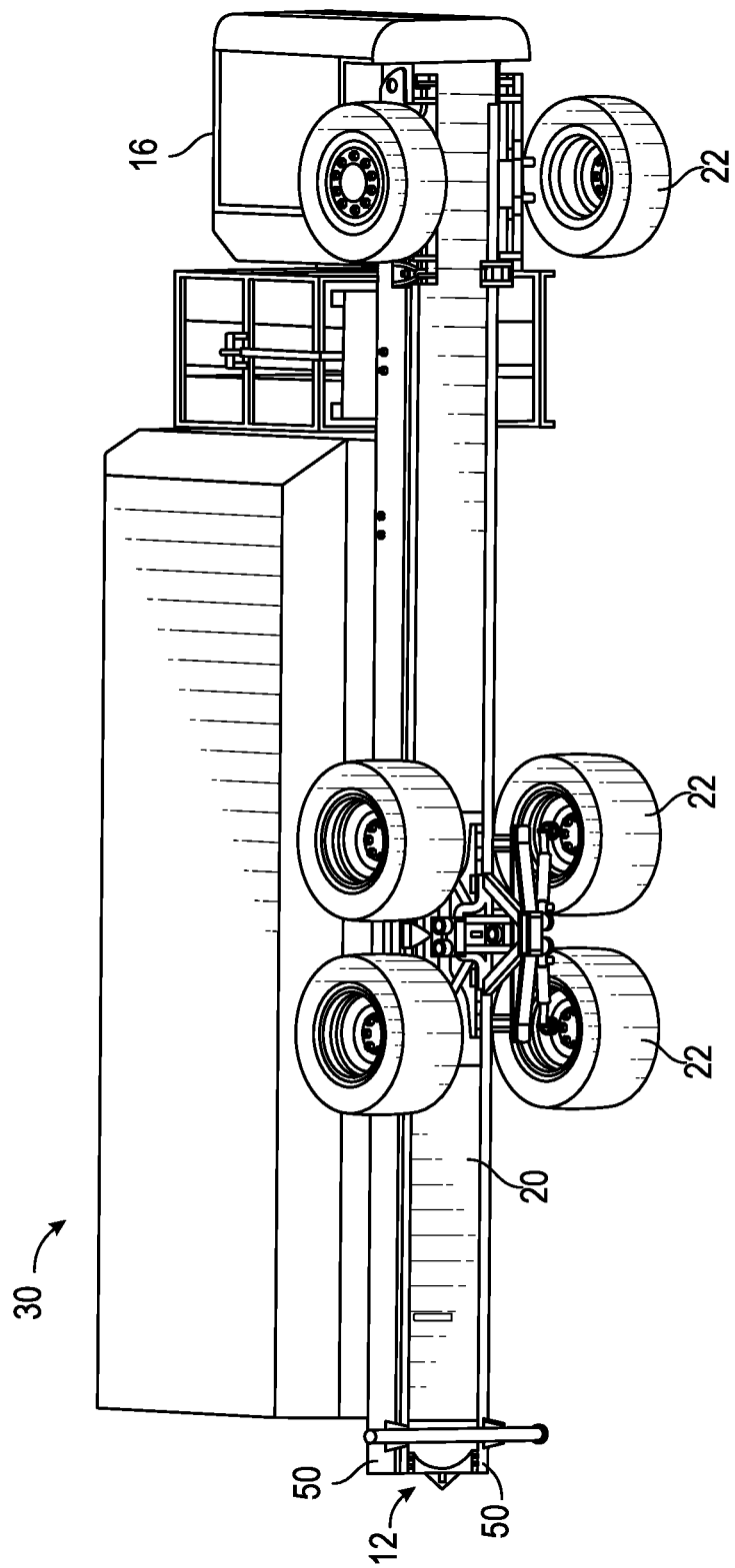
FIGS. 21A-21C illustrate the energy system configured as a frame slide out, according to various exemplary embodiments.
Figure 21B:
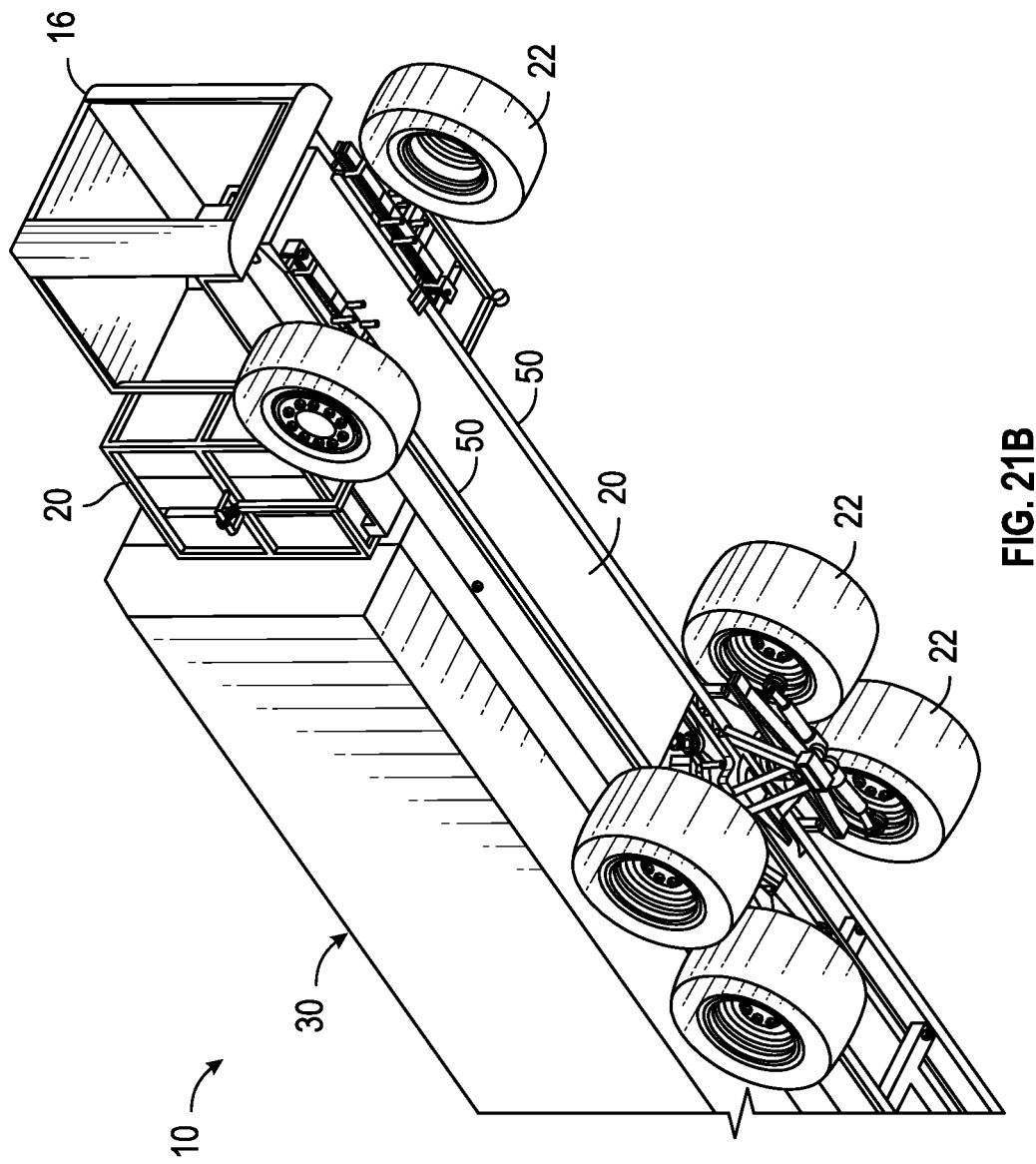
Figure 21C:
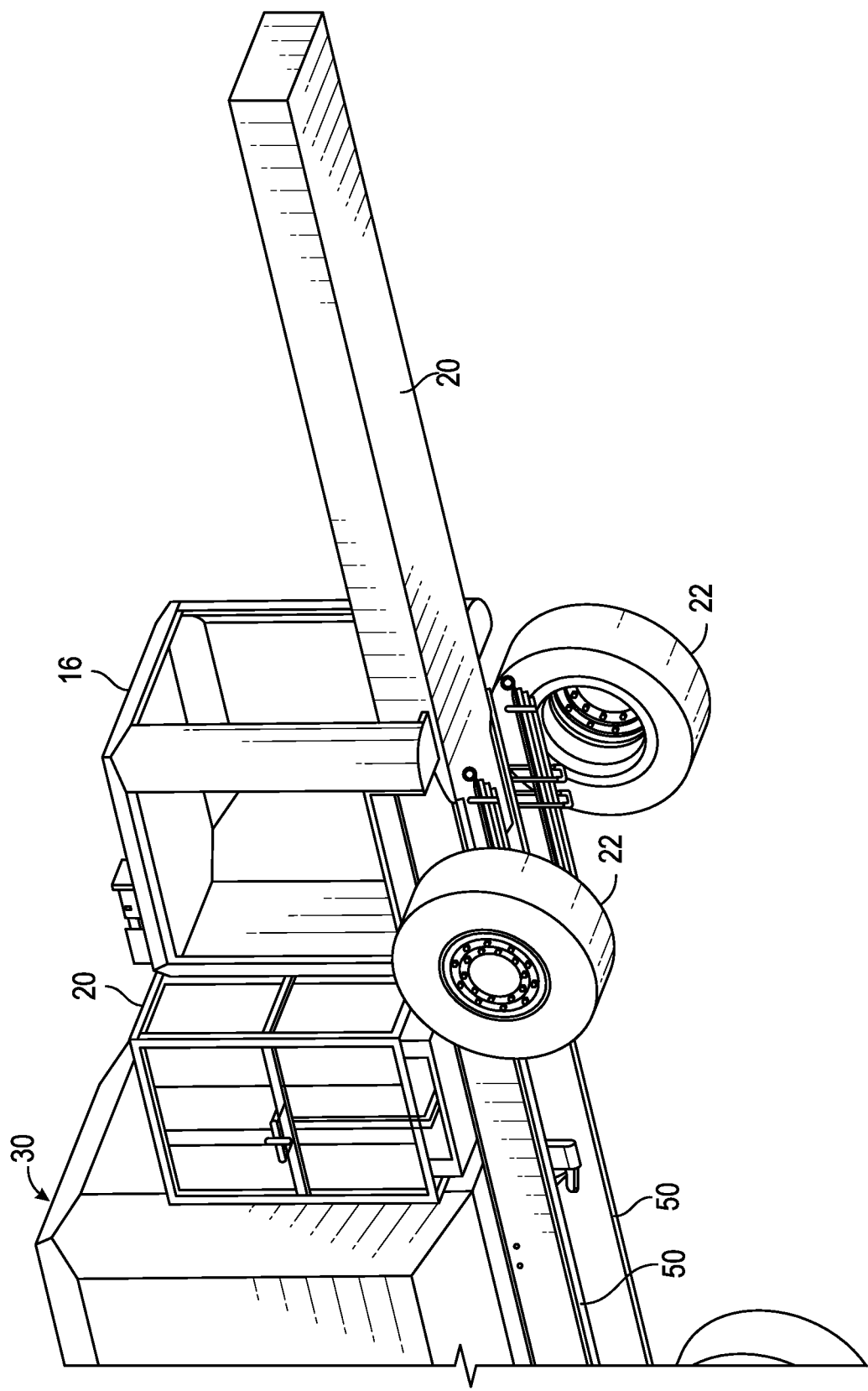

Referring now to FIG. 21A-21C, the energy system 20 may be configured as a frame slide-out, in some embodiments. Such a configuration of the energy system 20 may be similar to the configuration described above with respect to FIG. 6. As shown, for example, the energy system 20 may be configured to mount between frame rails 50 of the refuse vehicle 10. In some embodiments, the energy system 20 may span the length of the refuse vehicle 10, thereby distributing the weight of the energy system 20. In other embodiments, the energy system 20 may be located near a center point of the refuse vehicle 10, or near the rear end of the refuse vehicle 10. In some embodiments, the energy system 20 located underneath the refuse vehicle 10 is a primary or a secondary energy system, where a second energy system (e.g., a second one of the energy system 20) may be mounted on the refuse vehicle 10. The second energy system 20 may be located behind the cab 16, as shown, for example, or may be located at the rear end of the refuse vehicle 10, and may be configured as the primary or the secondary battery.

In one example, the energy system 20 located underneath the refuse vehicle 10 (e.g., between frame rails 50) may be a primary battery, configured to provide energy for normal or reduced operations of the refuse vehicle 10 (e.g., moving the refuse vehicle 10 around a storage yard). In this example, the second energy system 20, shown behind the cab 16, may be selectively loaded to increase the operational capacity of the refuse vehicle. For example, a second energy system may be loaded onto the refuse vehicle 10 in order to extend the range or the operating time of the refuse vehicle 10.

In some embodiments, the energy system 20 may be removed (e.g., for charging or replacement) or installed by sliding the energy system 20 out of a front end or a rear end of the refuse vehicle 10. As shown in FIG. 21C, for example, the energy system 20 may be removed by sliding the energy system 20 forward, between the frame rails 50, and out the front end of the refuse vehicle. In some such embodiments, removing the energy system 20 may include removing a front cover or a front bumper of the refuse vehicle. In other embodiments, the energy system 20 may be mounted below a front bumper or front cover the refuse vehicle 10 to facilitate energy system removal or replacement.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse vehicle comprising:
   a chassis;
   a tractive assembly coupled to the chassis and configured to propel the refuse vehicle;
   an electric energy system configured to provide electrical energy to drive the tractive assembly; and
   a removal assembly comprising a lift device that is at least partially supported by the chassis and that is configured to move an energy system relative to the chassis while remaining coupled to the chassis, wherein:
      in a first configuration, a first energy system is removably coupled to the chassis and configured to provide the electrical energy to the electric energy system; and
      in a second configuration, the first energy system is removed from the chassis and replaced with a second energy system, the second energy system removably coupled to the chassis and configured to provide the electrical energy to the electric energy system.

2. The refuse vehicle of claim 1, wherein the electric energy system is further configured to generate electrical energy to charge at least one of the first energy system or the second energy system.

3. The refuse vehicle of claim 1, wherein each of the first energy system and the second energy system comprise a frame and a plurality of battery assemblies.

4. The refuse vehicle of claim 1, wherein transitioning from the first configuration to the second configuration comprises:
  decoupling the first energy system from the chassis;
  supporting, by the lift device, the first energy system;
  moving the first energy system relative to the chassis; and
  coupling the second energy system to the chassis such that the second energy system provides the electrical energy to the electric energy system.

5. The refuse vehicle of claim 1, wherein the lift device is configured to engage one or more engagement elements of the first energy system to lift the first energy system off of the chassis.

6. The refuse vehicle of claim 1, wherein the refuse vehicle is transitioned from the first configuration to the second configuration to facilitate charging of the first energy system.

7. The refuse vehicle of claim 1, further comprising a first trailer removably coupled to the chassis of the refuse vehicle, the first trailer comprising a first frame and a first tractive assembly, wherein:
  the first energy system is coupled to the first trailer;
  the second energy system is coupled to a second trailer comprising a second frame and a second tractive assembly; and
  replacing the first energy system with the second energy system comprises decoupling the first trailer from the chassis and coupling the second trailer to the chassis.

8. The refuse vehicle of claim 1, wherein the first energy system is disposed between frame rails of the chassis and slidably engaged with the frame rails, the first energy system removable through a front end or a rear end of the refuse vehicle.

9. The refuse vehicle of claim 1, wherein the first energy system comprises:
  a frame;
  a plurality of shelves movably coupled to the frame; and
  a plurality of batteries supported by the plurality of shelves.

10. A replaceable battery system for a refuse vehicle, the system comprising:
  a first energy system comprising a first frame and a first plurality of battery assemblies;
  a second energy system comprising a second frame and a second plurality of battery assemblies, wherein:
    in a first configuration, the first energy system is coupled to a chassis of the refuse vehicle and configured to provide electrical energy to a prime mover of the refuse vehicle in order to drive one or more tractive elements to propel the refuse vehicle; and
    in a second configuration, the first energy system is removed and the second energy system is coupled to the chassis and configured to provide the electrical energy to the prime mover; and
  a removal assembly comprising a lift device that is configured to be supported by the chassis of the refuse vehicle and is configured to move at least one of the first energy system or the second energy system relative to the chassis while remaining coupled to the chassis.

11. The system of claim 10, wherein the first energy system and the second energy system are configured to couple to an electromagnetic device onboard the refuse vehicle and to receive charge from the electromagnetic device.

12. The system of claim 10, wherein transitioning between the first configuration and the second configuration comprises:
  decoupling the first energy system from the chassis;
  supporting, by the lift device, the first energy system;
  moving the first energy system relative to the chassis; and
  coupling the second energy system to the chassis such that the second energy system provides electrical energy to the prime mover.

13. The system of claim 10, wherein at least one of the first plurality of battery assemblies is removably coupled to the first frame.

14. The system of claim 10, wherein the first energy system further comprises a plurality of support shelves coupled to the first frame, and wherein a first one of the first plurality of battery assemblies is supported by a first one of the plurality of support shelves, and wherein a second one of the first plurality of battery assemblies is supported by a second one of the plurality of support shelves.

15. The system of claim 10, wherein the system is transitioned from the first configuration to the second configuration to facilitate charging of the first energy system.

16. The system of claim 10, wherein:
  the first energy system is coupled to a first trailer comprising a first trailer frame and a first tractive assembly, the first trailer detachably coupled to the chassis in the first configuration;
  the second energy system is coupled to a second trailer comprising a second trailer frame and a second tractive assembly, the second trailer detachably coupled to the chassis in the second configuration; and
  transitioning from the first configuration to the second configuration comprises decoupling the first trailer from the chassis and coupling the second trailer to the chassis.

17. The system of claim 10, wherein the first energy system is configured to be disposed between frame rails of the chassis and configured to be removed from the refuse vehicle by sliding the first energy system between the frame rails and out a front end or a rear end of the refuse vehicle.

18. A method of replacing a power source of a refuse vehicle, comprising:
  disengaging the first energy system that is removably coupled to a chassis of the refuse vehicle and configured to provide electrical energy to an electric energy system to drive a tractive assembly of the refuse vehicle from the chassis, the tractive assembly coupled to the chassis and configured to propel the refuse vehicle;
  supporting, by a removal assembly comprising a lift device that is at least partially supported by the chassis and that remains coupled to the chassis during removal of the first energy system, the first energy system;
  moving, by the lift device, the first energy system relative to the chassis; and
  coupling a second energy system to the chassis such that the second energy system is removably coupled to the chassis and provides the electrical energy to the electric energy system.

19. The method of claim 18, wherein moving the first energy system relative to the chassis includes powering, by the second energy system, at least one electric motor powering the tractive assembly to drive the refuse vehicle away from the first energy system.

20. The method of claim 18, wherein supporting the first energy system comprises engaging, by the lift device, an engagement element of the first energy system;
and lifting, by the lift device, the first energy system off of the chassis.

* * * * *